(12) United States Patent
Davies et al.

(10) Patent No.: US 8,725,594 B1
(45) Date of Patent: May 13, 2014

(54) CONTINUOUS FLOW EXECUTION

(75) Inventors: John Merrow Davies, Costa Mesa, CA (US); Talbot T. Smith, Garden Grove, CA (US); Michael Paul Bringle, Irvine, CA (US); Lawrence Flon, Costa Mesa, CA (US)

(73) Assignee: PTC Inc., Needham, MA (US)

( * ) Notice: Subject to any disclaimer, the term of this patent is extended or adjusted under 35 U.S.C. 154(b) by 2570 days.

(21) Appl. No.: 09/998,698

(22) Filed: Nov. 30, 2001

Related U.S. Application Data

(60) Provisional application No. 60/299,253, filed on Jun. 19, 2001.

(51) Int. Cl.
*G06Q 10/00* (2012.01)

(52) U.S. Cl.
USPC .......... 705/28; 705/7.12; 705/7.25; 705/7.27; 705/29

(58) Field of Classification Search
None
See application file for complete search history.

(56) References Cited

U.S. PATENT DOCUMENTS

| | | | |
|---|---|---|---|
| 5,285,392 A * | 2/1994 | Kyle et al. ............ | 700/100 |
| 5,694,551 A | 12/1997 | Doyle et al. | |
| 5,884,300 A | 3/1999 | Brockman | |
| 5,946,662 A | 8/1999 | Ettl et al. | |
| 6,115,690 A | 9/2000 | Wong | |
| 6,119,149 A | 9/2000 | Notani | |
| 6,343,275 B1 | 1/2002 | Wong | |
| 6,347,295 B1 * | 2/2002 | Vitale et al. ........ | 704/209 |
| 6,463,345 B1 * | 10/2002 | Peachey-Kountz et al. | 700/99 |
| 6,947,903 B1 * | 9/2005 | Perry ................ | 705/28 |
| 7,085,729 B1 * | 8/2006 | Kennedy et al. ........ | 705/10 |
| 7,409,356 B1 * | 8/2008 | Geddes et al. ........ | 705/7.25 |
| 2002/0138316 A1 | 9/2002 | Katz et al. | |
| 2002/0138358 A1 | 9/2002 | Scheer | |
| 2002/0184070 A1 * | 12/2002 | Chen et al. ............ | 705/9 |

* cited by examiner

*Primary Examiner* — M. Thein
(74) *Attorney, Agent, or Firm* — Greenberg Traurig, LLP; David J. Dykeman

(57) ABSTRACT

A system that facilitates continuous flow execution of orders is provided. The system includes a supply chain data store that stores supply chain data (e.g., inventory, supply, demand) and a data acceptor operable to receive the supply chain data from supply chain members, to conform the supply chain data to supply chain schema and to validate the supply chain data. The system also includes an inventory deployment analyzer that analyzes a user defined inventory network and accounts for the stored supply chain data to produce inventory transfer recommendations, transfer orders, alerts and/or a diversion order.

16 Claims, 17 Drawing Sheets

Prior Art Fig. 5

CONTINUOUS FLOW EXECUTION

CROSS-REFERENCE TO RELATED APPLICATIONS

This application claims the benefit of U.S. Provisional Application Ser. No. 60/299,253 entitled SYSTEM AND METHOD FOR COLLABORATIVE SUPPLY CHAIN PROCESSING, filed on Jun. 19, 2001.

TECHNICAL FIELD

The present invention generally relates to a system, schema and/or method for collaborative supply chain data processing, and more particularly, to performing continuous flow execution of supply sourcing.

BACKGROUND OF THE INVENTION

In traditional supply chains, material trickles downstream sequentially while data moves back upstream sequentially. A supply chain may include multiple enterprises that need to communicate and to cooperate to insure that goods and/or services are moved from suppliers to consumers in a timely, efficient manner. A supply chain may include, for example, buyers and sellers, which may also be referred to as purchasers and suppliers. A supply chain may include, for example, members that demand a quantity of a product and members that supply product.

Conventionally, supply chain data is stored in a series of individually owned, controlled and/or designed databases, where data concerning issues like predictions of supply and demand may age rapidly and thus lose relevance and/or validity. An enterprise may be a member of many supply chains. For example, a widget producer may ship widgets to a variety of sources including widget assemblers, widget customizers, widget testers, widget wholesalers, widget retailers and widget consumers. Furthermore, a widget may arrive at its ultimate destination via multiple supply chains. For example, a first widget consumer may receive a widget directly from a widget producer, a second widget consumer may receive a widget via a widget retailer who received it from a widget wholesaler, and a third widget consumer may receive a widget via a widget customizer and widget tester. Each point in a different supply chain may employ different forms, data and/or customs to achieve delivery and facilitate record keeping. Thus, one widget supplier may have to maintain multiple supply chain protocols, forms and/or records to communicate with members of the various supply chains of which it is a member. This increases complexity and thus reduces efficiency in supply chain operations. As contract manufacturing, dedicated suppliers and vendor managed inventories increase, such problems are exacerbated due to the expanding network of enterprises included in a supply chain.

Conventionally, supply chain members deployed inventory between facilities based on projections concerning supply and demand. Such projections may be based on models that account for a number of factors like historical demand, historical supply, phoned in updates and inventory manager intuition. However, such projections become stale as soon as they are issued since they do not rely on the actual inventory, supply and/or demand situation. The projections grow increasingly more stale as a reporting period progresses. For example, a report generated for a one month long reporting cycle may initially be acceptable. However, changing conditions in the field (e.g., warehouse fire, run on supply at a location, work action slowdown) may make the report unacceptably inaccurate. Typically, there were limited, if any, means to adapt inventory distributions within a reporting cycle.

Some companies may have employed vendor managed inventory programs where a buyer would agree to buy a certain contractual quantity of a product over a period of time (so that the supplier can predict demand) or the supplier would agree to maintain minimum stocking levels at a site (so that consumers have an adequate supply) whereby the supplier replenished as needed. Using this vendor managed inventory program, safety stock levels may have been maintained at too high a level, which increased overhead, reduced profits and lead to spoilage. Furthermore, there may be a delay between inventory level monitoring and replenishment, which can lead to over and/or under inventory positions.

Conventionally, an enterprise may be a member of many supply chains. For example, a widget producer may ship such widgets to a variety of sources including widget assemblers, widget customizers, widget testers, widget wholesalers, widget retailers and widget consumers. Furthermore, a widget may arrive at its ultimate destination via multiple supply chains. For example, a first widget consumer may receive a widget directly from a widget producer, a second widget consumer may receive a widget via a widget retailer who received it from a widget wholesaler, and a third widget consumer may receive a widget via a widget customizer and widget tester. Each point in a different supply chain may employ different forms, data and/or customs to achieve delivery and facilitate record keeping. Thus, one widget supplier may have to maintain multiple supply chain protocols, forms and/or records to communicate with members of the various supply chains of which it is a member. This increases complexity and thus reduces efficiency in supply chain operations. As contract manufacturing, dedicated suppliers and vendor managed inventories increase, such problems are exacerbated due to the expanding network of enterprises included in a supply chain.

Supply chains may be more complicated than a one supplier to one consumer relationship. For example, a product delivered to a consumer may depend on multiple suppliers. By way of illustration, a desktop computer product may depend on a main console supplier, a monitor supplier and a printer supplier. Conventionally, it has been very difficult to integrate monitoring the inventory and/or delivery of each of the component parts of the product because it has been difficult, if possible at all, for the related suppliers to view related inventory and/or order information, for example.

Conventionally, each member of a supply chain keeps individual records concerning its enterprise. By way of illustration, a supply chain member may keep records concerning items including, but not limited to, predicted demand, predicted supply, purchase orders sent, purchase orders received, inventory, sales orders sent, sales orders received, warehouse orders, shipments, and the like. Such records may be stored in one or more individually owned, controlled and/or designed databases and may be stored in inconsistent formats. Typically, supply chain members do not open their databases to access from other supply chain members. Thus, to communicate with other supply chain members it has been customary to exchange EDI data and/or paper printouts. Producing, shipping and interpreting both EDI and paper printouts introduce delays and potential points of confusion into supply chain processing. Furthermore, EDI and/or paper employed in one supply chain may not be interchangeable with other supply chains, creating additional complexity in supply chain data processing. Such individually owned, controlled and/or designed databases and their associated independent aging are a roadblock to performing continuous flow execution of matching supply to demand.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a system, schema and/or method for collaborative supply chain data processing, and more particularly, to facilitating continuous flow execution of matching supply to demand and thus facilitates optimal inventory allocation to satisfy real-time demand based on real or near-real-time data.

The present invention facilitates a trading community (e.g., a supply chain) deploying inventory between facilities based on analysis of supply at source facilities and demand at requesting facilities in a real and/or near real-time manner. By analyzing supply and demand within a user-defined network of facilities, where such analysis can employ user defined and/or configurable rules, sets of recommendations for inventory movement can be generated. In one example of the present invention, such recommendations can be implemented by issuing transfer orders that can be automatically executed. In contrast to conventional systems that rely on static reports, the present invention can respond to changes in inventory situations (e.g., warehouse fire, run on inventory at a location) through the continuous monitoring of inventory. Furthermore, in contrast to single point to point communications between suppliers and consumers, which can lead to integration problems for multiple component products, the present invention facilitates suppliers of related components involved in supplying a demand to view related information and make informed inventory distribution decisions.

The present invention provides an Internet accessible database and analysis component that produces Web browseable inventory redeployment recommendations based on automated analyses of inventory information. Thus, rather than paper and/or EDI based inventory control reports, which suffer from latency and aging problems, real and/or near real-time, dynamic replenishment of inventory is possible.

Continuous monitoring of inventory is facilitated by supply chain members depositing selected inventory information in a central data store (e.g., a database). The supply chain members may define a network of nodes to include in a supply chain, and may further define supply and demand factors for each node. The user may also write formulae and/or algorithms to employ to analyze the supply and/or demand situation at a node to facilitate modeling supply and/or demand and to facilitate satisfying supply and/or demand in accordance with different rules and/or models. The model can be employed to generate proactive alerts and to automatically cause transfers to occur.

Such continuous monitoring of inventory, coupled with the ability to generate inventory transfer recommendations and proactive, real-time alerts facilitates mitigating problems associated with synchronizing multiple events.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Prior Art

DETAILED DESCRIPTION OF THE INVENTION

Figure 1:
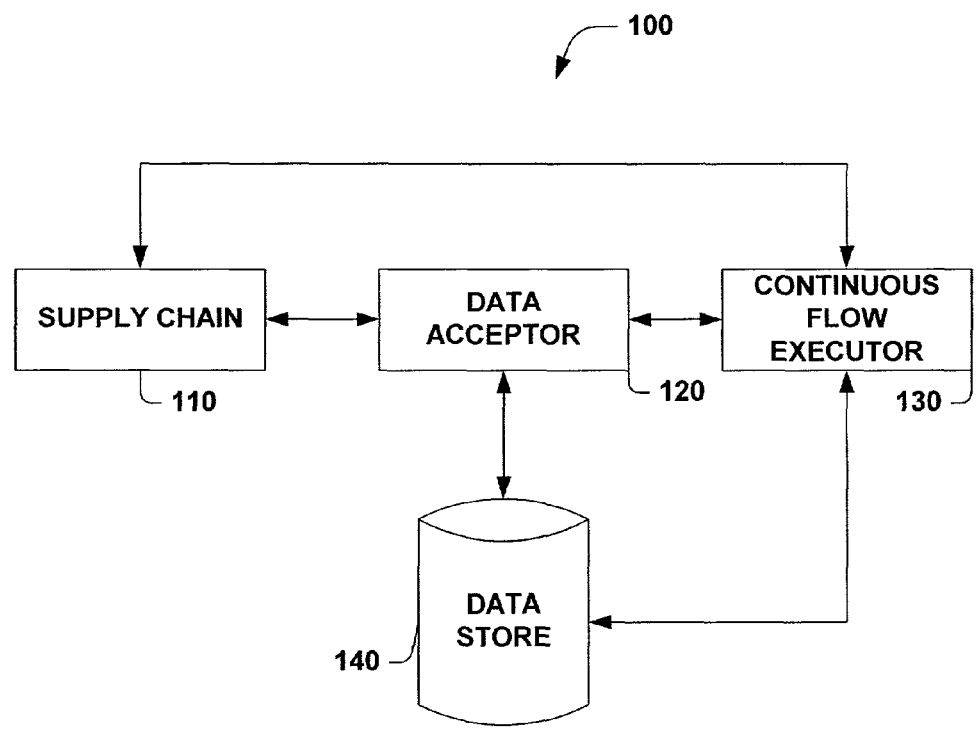
FIG. 1 is a schematic block diagram illustrating a continuous flow execution (CFE) system, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

Extraction is a process by which data is retrieved from a data source and placed in a central staging environment where it may be transformed. There are different types of extractions. Transformation is a process that includes cleansing incorrect data, resolving missing elements, ensuring conformance to standards, purging unnecessary fields, conforming data to one or more supply chain schema, combining data where appropriate, creating surrogate keys to avoid dependence on source system keys and building aggregate and summary information where required. Loading is a process in which transformed data is loaded into a data store and during which indices for dimensions in the data store are created.

A key is a value that identifies a record in a database. The collection of keys for records in a database form an index. A primary key is a key that is selected to identify an entity, object, or record. A foreign key is an attribute within a database record that uniquely identifies another record, therefore serving as a reference from one record to another.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

Referring now to FIG. 1, a system 100 for performing continuous flow execution (CFE) is illustrated. The system includes a data acceptor 120 that will accept one or more pieces of supply chain information from a supply chain 110. The supply chain 110 may include, for example, one or more suppliers of one or more products and one or more demanders of such product. The information may include, for example, inventory positions (including capacity), supply reports, demand requests, and the like. The data acceptor 120 can process such input data and store the data in a data store 140. Such processing can include, but is not limited to, validating, transforming, cleansing and securing such input data, for example. With the supply and demand data stored in the data store 140, the continuous flow executor 130 can perform CFE processing on such data, to more optimally match supply with demand in a real and/or near-real-time manner, mitigating problems with conventional static systems.

Continuous flow execution analysis is based on a cycle, where a cycle is owned by an enterprise and includes a network, an active product set and a category set. A cycle may have triggering mechanisms including, but not limited to, a manual trigger, a periodic trigger and database update trigger. A cycle may also employ inventory distribution rules including, but not limited to, equal share algorithms, proportional algorithms and priority algorithms.

A cycle network is a set of facilities linked by distribution paths (e.g., a set of factories and stores linked by truck delivery routes). A facility may supply inventory to other facilities and/or may receive inventory from other facilities. Inventory flows along distribution path links, from a supplier to a receiver, and thus, in one example of the present invention, the network is a directed acyclic graph. Distribution path links have an associated supply priority and/or demand priority that can be employed to determine the order of processing during analysis. It is to be appreciated that while a user defined network may be associated with a directed acyclic graph, that other collections of nodes may be employed in accordance with the present invention. For example, collections including, but not limited to a graph, a tree, a list, a linked list, a heap, a stack and an array may be employed in accordance with the present invention.

A cycle active product set is the list of products for which supply and demand will be analyzed to generate redeployment suggestions and/or transfer orders. A cycle category set is a set of supply and/or demand categories to be considered when calculating availability and requirements. The supply and/or demand categories may be, for example, formulae for calculating actual supply or demand quantities. Supply categories may be matched with demand categories through user-configurable matching items including, but not limited to a table, a graph, a neural network and an expert system. Matches between supply and demand categories define which demand categories may be filled by which supply categories. The category set for a cycle may be employed to determine an analysis strategy (e.g., supply-first, demand-first).

Cycle characteristics may be manually created and/or managed by a user, and in one example of the present invention may also be created and/or managed automatically through artificial intelligence systems and/or processes (e.g., expert system, neural network, self-organizing map).

Continuous flow execution analyses are executed according to the triggering mechanisms defined in configured cycles. Manual triggers are executed in response to a user selection. In one example of the present invention, periodic analyses are executed by a daemon process and database update triggers are executed in response to a signal, interrupt and/or message from the database that was updated.

In one example of the present invention, the continuous flow executor 130 includes a continuous flow execution analyzer that operates on one cycle at a time, and iterates through the active products in that cycle. The continuous flow execution analyzer employs the cycle network and category set to calculate supply and demand and to match and balance supply and demand between linked nodes in a network. For example, a demand/supply matcher may pair supply categories with demand categories and prioritize the pairs. A formula evaluator may then employ formulae in the category pairs to evaluate actual quantities of supply and demand at nodes in the network. The actual quantities may then be employed by a network analyzer that balances the network to produce transfer recommendations that can be reported on items including, but not limited to, a supplying facility, a receiving facility, a product and the like.

Thus, the present invention facilitates up to date analysis that can be employed to re-deploy inventory, providing advantages over conventional systems that do not perform such up to date analyses.

Continuous flow execution category matching concerns rule based matching of supply and demand based on business hierarchies of priorities and needs and determines the amount of inventory to be deployed between network nodes. In one example of the present invention, the continuous flow executor 130 has at least three subcomponents: a demand/supply matching subcomponent; a formula evaluation subcomponent and a network analysis (e.g., broadcast trading algorithm based) subcomponent.

The demand/supply matching subcomponent is responsible for determining which demand and supply categories to match and the order in which they are to be matched. The formula evaluation subcomponent calculates demand and supply from formulae for demand and supply categories. The network analysis component calculates recommended deployments based on demand supply values calculated by the formula evaluation subcomponent.

In one example of the present invention, the continuous flow execution matching component accepts as input a configured CFE cycle, which includes a network identifier, an active products list, a category set identifier and one or more sharing rules. The active products are the list of products to include in the CFE calculations and thus CFE analysis is performed for products in the list. A category set includes both the formulae for each category and the category matching rules. A category set may be a demand set (which contains demand categories) or a supply set (which contains supply categories). The demand/supply categories are ranked within the category set. Formulae identify how to calculate the quantity of the demand or supply. The category matching rules relate the categories of the category set to the opposing categories and prioritize such related categories. For example, a demand category set lists the demand categories and the order in which to consider them and the category matching rules list for each demand category in the set, which supply categories that should be used for supply. A user may choose a demand/supply preference by choosing a demand category set or a supply category set.

Sharing rules are employed to describe how to allocate supply among destinations and demand among sources. For example, sharing rules may include, but are not limited to fair share rules, equal rules and priority rules. Fair share rules prorate among network links from a node. Equal rules provide equal amounts to network links from a node. Priority rules allocate quantity to network links according to priority. While the system may be distributed with pre-configured sharing rules, a user may configure both a demand sharing rule and a supply sharing rule and in one example of the present invention, such rules may be programmed by a user of the system.

The present invention may employ a continuous flow execution broadcast trading algorithm. This algorithm is concerned with calculating recommended inter node transfers given supply and demand data for a network of supply chain nodes. The algorithm applies a supply category to a demand category. The algorithm employs an ask/offer/order model, where demand nodes asks suppliers for product, where supply nodes offer a share to customers and where demand nodes order product from the available supplier share. The algorithm can be configured to apply rules including, but not limited to fair share (e.g., pro rata), equal allocation and/or priority (both demand and supply) rules and can be configured to favor demand processing or supply processing.

Such continuous monitoring of inventory, coupled with the ability to generate inventory transfer recommendations and proactive, real-time alerts facilitates mitigating problems associated with synchronizing multiple events. For example, it may be valuable to synchronize the fulfillment and/or delivery or multiple components between multiple enterprises in a real or pseudo real-time manner. The present invention facilitates real time synchronization of multiple events by coupling multi-enterprise visibility with synchronization triggers. By way of illustration, there may be limited value in delivering the main computer consoles described above until the computer monitors and printers are ready to be shipped. Thus, multi-enterprise visibility and continuous inventory monitoring provided by the present invention can be employed to view data associated with delivery schedules for the three separate components and to coordinate such delivery.

Within a user-defined network, nodes may have different rules and/or attributes applied to them, and nodes may employ different algorithms to determine how supply and demand are to be handled. For example, a first node may employ a best fit algorithm to distribute inventory while a second node may employ a worst fit algorithm and a third node may employ a first fit algorithm. Other nodes may employ sophisticated bid/ask algorithms in an attempt to maximize factors including, but not limited to, profit, equitable distribution, time to market and market saturation. Furthermore, the algorithm applied by a node may vary depending on whether the node is providing demand or supply. In one example of the present invention, the algorithm may be automatically adapted by machine learning to facilitate improving subsequent performance.

Figure 2:
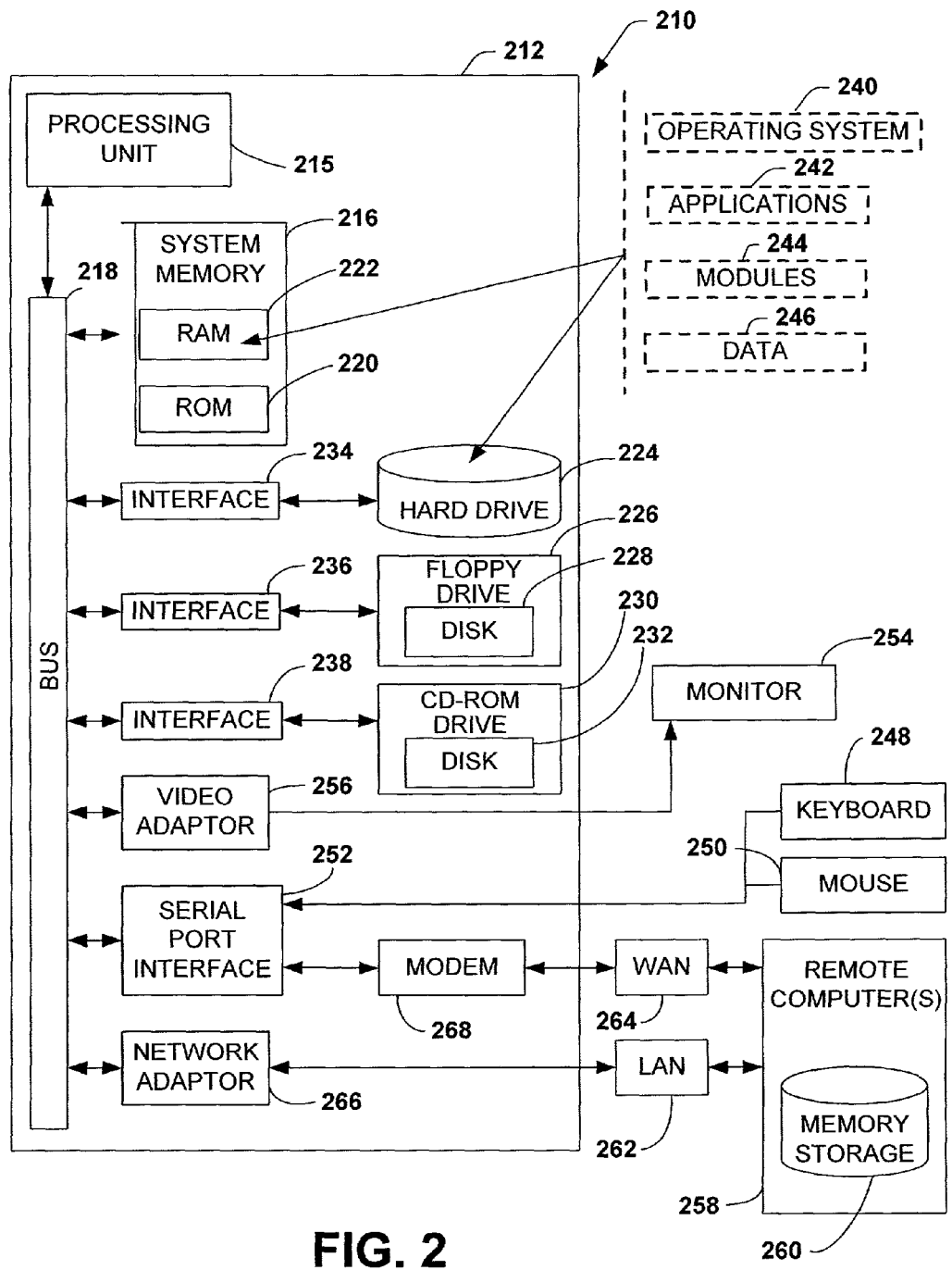
FIG. 2 is a schematic block diagram of an exemplary operating environment for a system configured in accordance with the present invention.

In order to provide additional context for various aspects of the present invention, FIG. 2 and the following discussion are intended to provide a brief, general description of one possible suitable computing environment 210 in which the various aspects of the present invention may be implemented. It is to be appreciated that the computing environment 210 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, it will be appreciated that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 2 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 2, an exemplary environment 210 for implementing various aspects of the invention includes a computer 212, including a processing unit 215, a system memory 216, and a system bus 218 that couples various system components including the system memory to the processing unit 215. The processing unit 215 may be any of various available processors. Dual microprocessors and other multi-processor architectures also can be used as the processing unit 215.

The system bus 218 may be any of several types of bus structure including a memory bus or memory controller, a peripheral bus, and a local bus using any of a variety of available bus architectures. The computer memory 216 includes read only memory (ROM) 220 and random access memory (RAM) 222. A basic input/output system (BIOS), containing the basic routines that help to transfer information between elements within the computer 212, such as during start-up, is stored in ROM 220.

The computer 212 may further include a hard disk drive 224, a magnetic disk drive 226, e.g., to read from or write to a removable disk 228, and an optical disk drive 230, e.g., for reading a CD-ROM disk 232 or to read from or write to other optical media. The hard disk drive 224, magnetic disk drive 226, and optical disk drive 230 are connected to the system bus 218 by a hard disk drive interface 234, a magnetic disk drive interface 236, and an optical drive interface 238, respectively. The computer 212 typically includes at least some form of computer readable media. Computer readable media can be any available media that can be accessed by the computer 212. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 212. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 222, including an operating system 240, one or more application programs 242, other program modules 244, and program non-interrupt data 246. The operating system 240 in the computer 212 can be any of a number of available operating systems.

A user may enter commands and information into the computer 212 through a keyboard 248 and a pointing device, such as a mouse 250. Other input devices (not shown) may include a microphone, an IR remote control, a joystick, a game pad, a satellite dish, a scanner, or the like. These and other input devices are often connected to the processing unit 215 through a serial port interface 252 that is coupled to the system bus 218, but may be connected by other interfaces, such as a parallel port, a game port, a universal serial bus ("USB"), an IR interface, etc. A monitor 254, or other type of display device, is also connected to the system bus 218 via an interface, such as a video adapter 256. In addition to the monitor, a computer typically includes other peripheral output devices (not shown), such as speakers, printers etc.

The computer 212 may operate in a networked environment using logical and/or physical connections to one or more remote computers, such as a remote computer(s) 258. The remote computer(s) 258 may be a workstation, a server computer, a router, a personal computer, microprocessor based entertainment appliance, a peer device or other common network node, and typically includes many or all of the elements described relative to the computer 212, although, for purposes of brevity, only a memory storage device 260 is illustrated. The logical connections depicted include a local area network (LAN) 262 and a wide area network (WAN) 264. Such networking environments are commonplace in offices, enterprise-wide computer networks, intranets and the Internet.

When used in a LAN networking environment, the computer 212 is connected to the local network 262 through a network interface or adapter 266. When used in a WAN networking environment, the computer 212 typically includes a modem 268, or is connected to a communications server on the LAN, or has other means for establishing communications over the WAN 264, such as the Internet. The modem 268, which may be internal or external, is connected to the system bus 218 via the serial port interface 252. In a networked environment, program modules depicted relative to the computer 212, or portions thereof, may be stored in the remote memory storage device 260. It will be appreciated that the network connections shown are exemplary and other means of establishing a communications link between the computers may be used.

Figure 3:
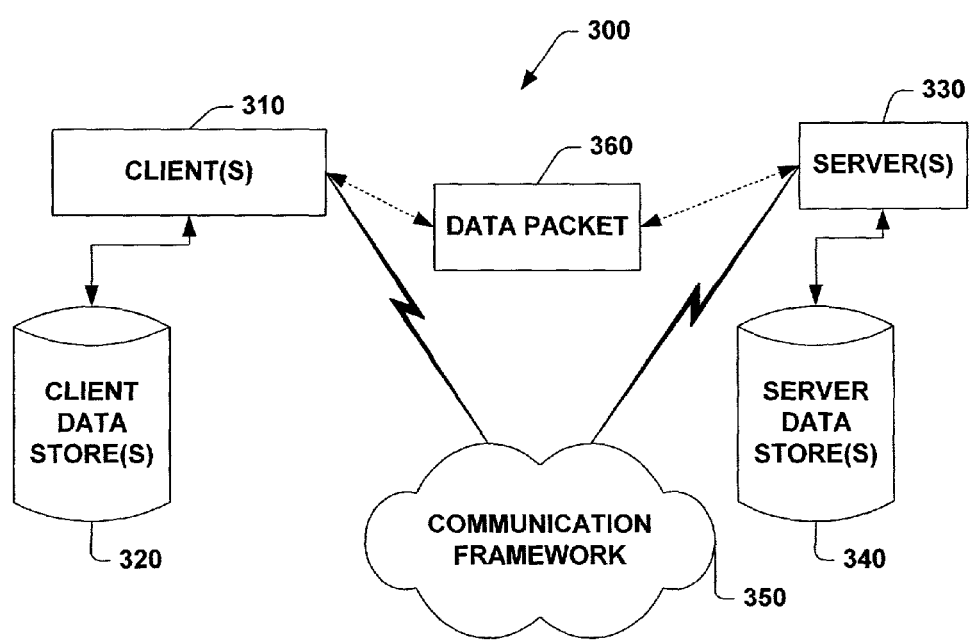
FIG. 3 is a schematic block diagram of an exemplary communication environment for a method performing in accordance with the present invention.

FIG. 3 is a schematic block diagram of a sample computing environment 300 with which the present invention may interact. The system 300 includes one or more clients 310. The clients 310 may be hardware and/or software (e.g., threads, processes, computing devices). The system 300 also includes one or more servers 330. The servers 330 may also be hardware and/or software (e.g., threads, processes, computing devices).

In one example of the present invention, a data packet 360 may be transmitted, for example, between a client 310 and a server 330. One example data packet 360 may hold continuous flow execution system information concerning, for example, available supply, current demand, and a fair share multiplier.

The system 300 includes a communication framework 350 that can be employed to facilitate communications between the clients 310 and the servers 330. The clients 310 are operably connected to one or more client data stores 315 that can be employed to store information local to the clients 310. Similarly, the servers 330 are operably connected to one or more server data stores 340 that can be employed to store information local to the servers 330.

Figure 4:
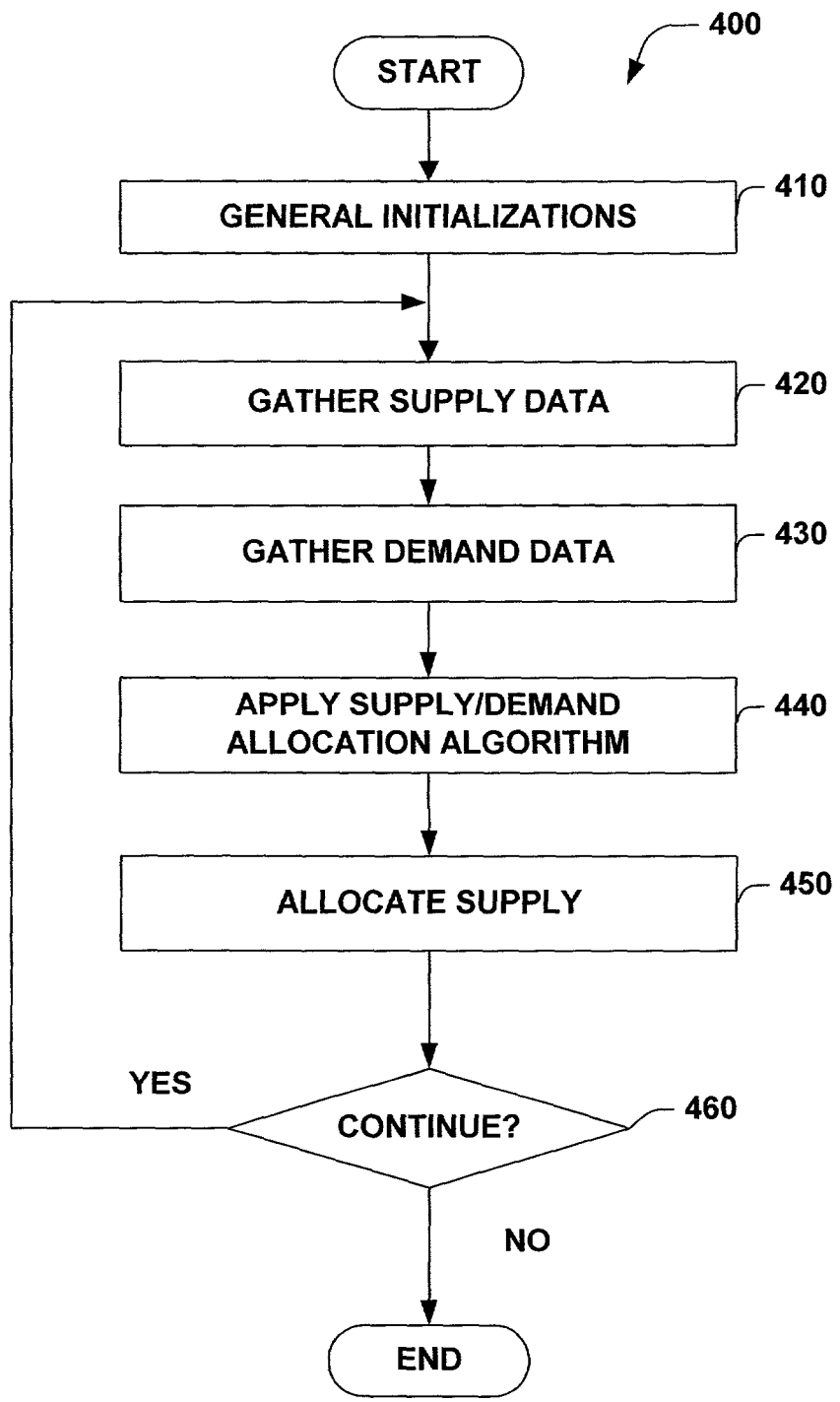
FIG. 4 is a flowchart illustrating a method for CFE of supply/demand matching, in accordance with an aspect of the present invention.
Figure 8:
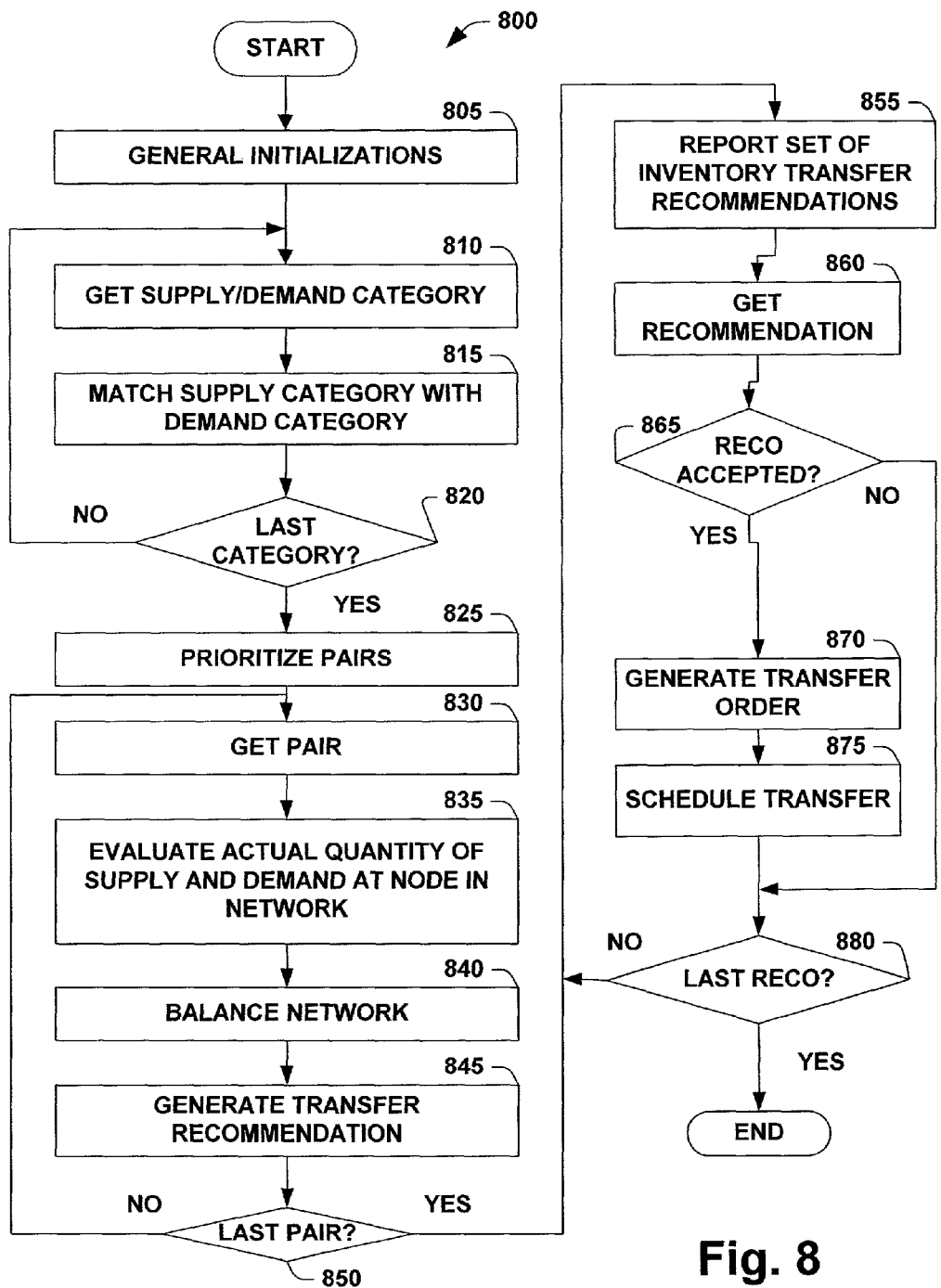
FIG. 8 is a flow chart illustrating a method for providing continuous flow execution, in accordance with an aspect of the present invention.
Figure 10:
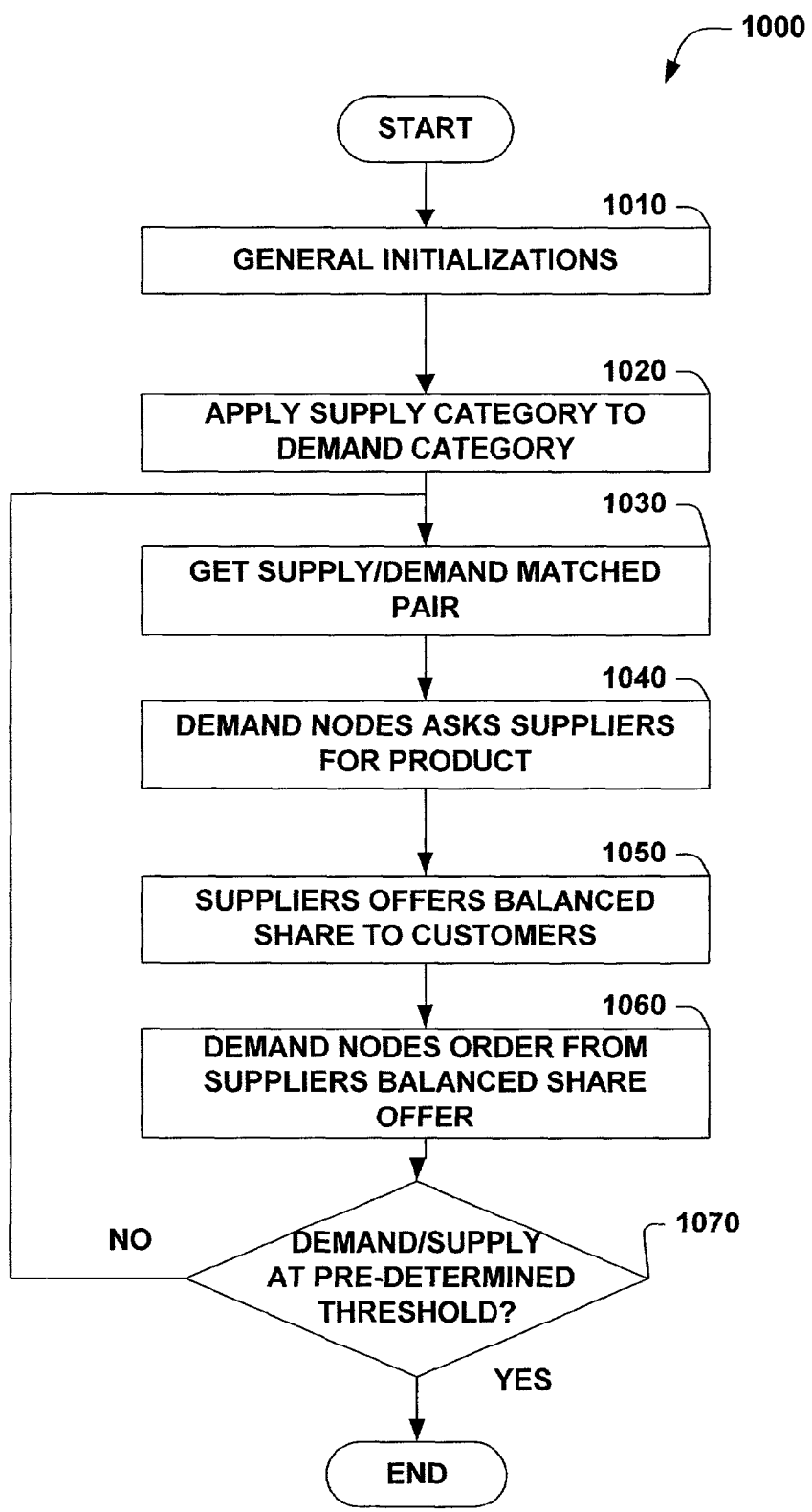
FIG. 10 is a flow chart illustrating a method for supporting continuous flow execution, in accordance with an aspect of the present invention.

In view of the exemplary systems shown and described herein, methodologies that may be implemented in accordance with the present invention will be better appreciated with reference to the flow charts of FIGS. 4, 8, and 10. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments. Furthermore, computer executable instructions operable to perform the methods described herein may be stored on computer readable media.

FIG. 4 illustrates a method 400 for performing CFE. At 410, general initializations occur. Such initializations include, but are not limited to, allocating memory, establishing pointers, establishing data communications, acquiring resources, instantiating objects, and setting initial values for variables. At 420, supply data is gathered. For example, data concerning current supply, which may include manufacturing capacity, may be gathered. Such supply data may be gathered, for example, from one or more supply chain members. Since the supply chain members may store such data in inconsistent formats, the supply data may, therefore, be cleansed, validated, transformed and stored in a central location to facilitate subsequent supply/demand analyses.

At 430, demand data is gathered. For example, data concerning current demand and/or anticipated demand may be gathered. Such demand data may be gathered, for example, from one or more supply chain members. Since the supply chain members may store such data in inconsistent formats, the demand data may, therefore, be cleansed, validated, transformed and stored in a central location to facilitate subsequent supply/demand analyses.

At 440, one or more supply/demand allocation algorithms may be employed to generate inventory (re)deployment recommendations. For example, a first supply chain member may be tasked with providing a first amount of product to a first supply chain demanding member and a second amount of product to a second supply chain demanding member. At 450, if such inventory (re)deployment recommendations are heeded, then at 450 the supply may be allocated. At 460, a determination is made concerning whether the method should continue. If the determination at 460 is YES, then processing returns to 420, otherwise, processing may conclude.

Figure 5:
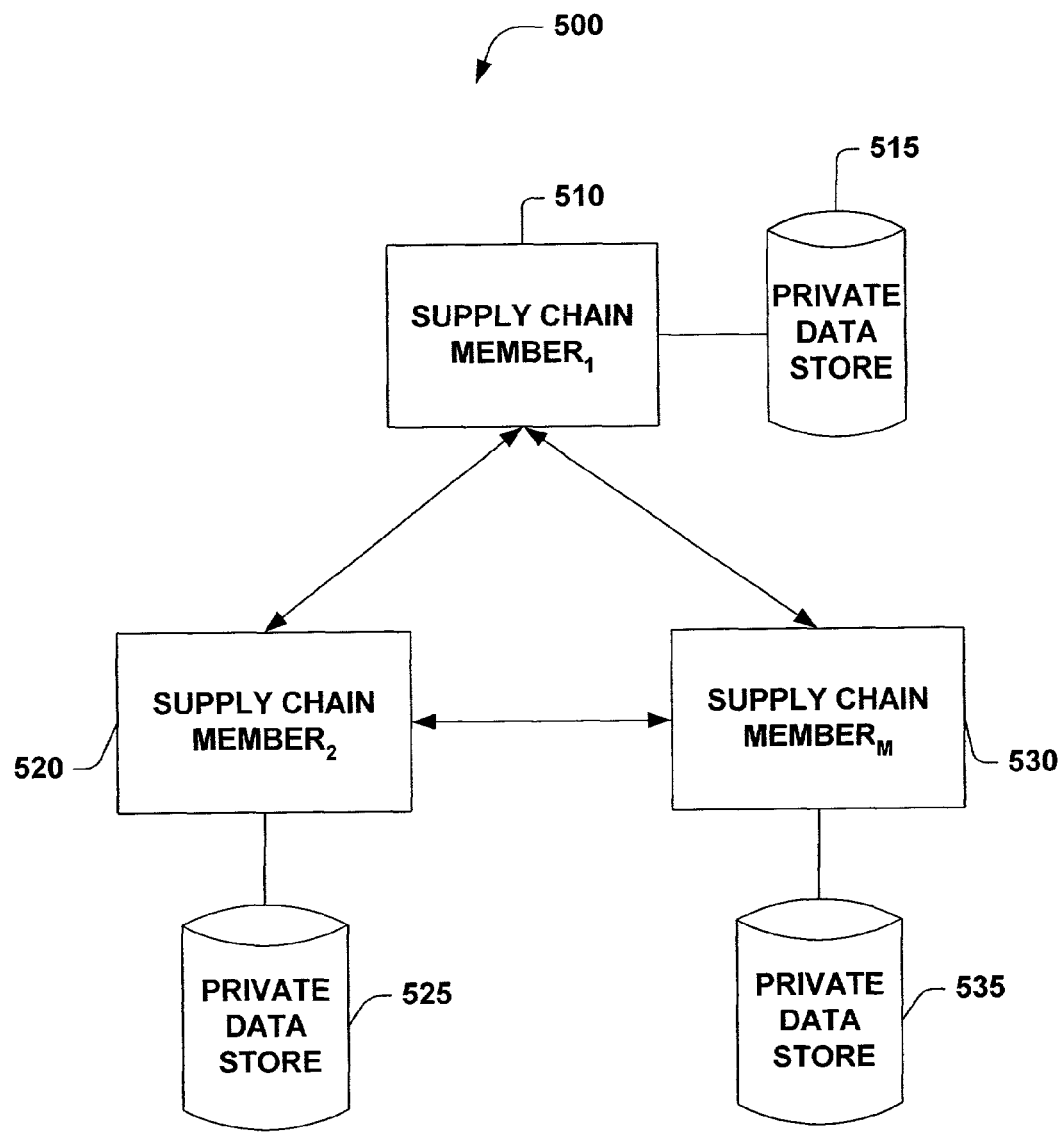
FIG. 5 is a schematic block diagram illustrating a conventional point-to-point supply chain.

Prior Art FIG. 5 illustrates a conventional point-to-point supply chain 500. The conventional supply chain 500 includes a plurality of supply chain members (e.g., SUPPLY CHAIN MEMBER$_1$ 510, SUPPLY CHAIN MEMBER$_2$ 520 through SUPPLY CHAIN MEMBER$_M$ 530, M being an integer). Such conventional supply chain members typically had individually owned and/or controlled private data stores (e.g., private data stores 515, 525 and 535) to which access was restricted. Such private data stores typically stored data with a schema, format and/or content unique to the supply chain member. Furthermore, such private data stores aged independently, which lead to potentially inconsistent supply and demand predictions being employed to allocate inventory. Thus, integration of data between supply chain members was made more difficult and if supply chain members communicated they typically communicated via EDI (Electronic Data Interchange) and/or paper to one or more other supply chain members. Supply chain members therefore often had to keep multiple protocols, forms, programs and/or procedures to communicate with the other supply chain members, and often had to perform numerous repetitious data entry functions that increased complexity, increased delays and increased costs. Supply chain members were typically reluctant to allow outside access to their private data stores across their security measures (e.g., firewalls). Thus, opportunities to integrate data, to establish relationships between related data, and to reduce the complexity of sharing supply chain data, and therefore reducing supply chain data processing costs were missed.

Figure 6:
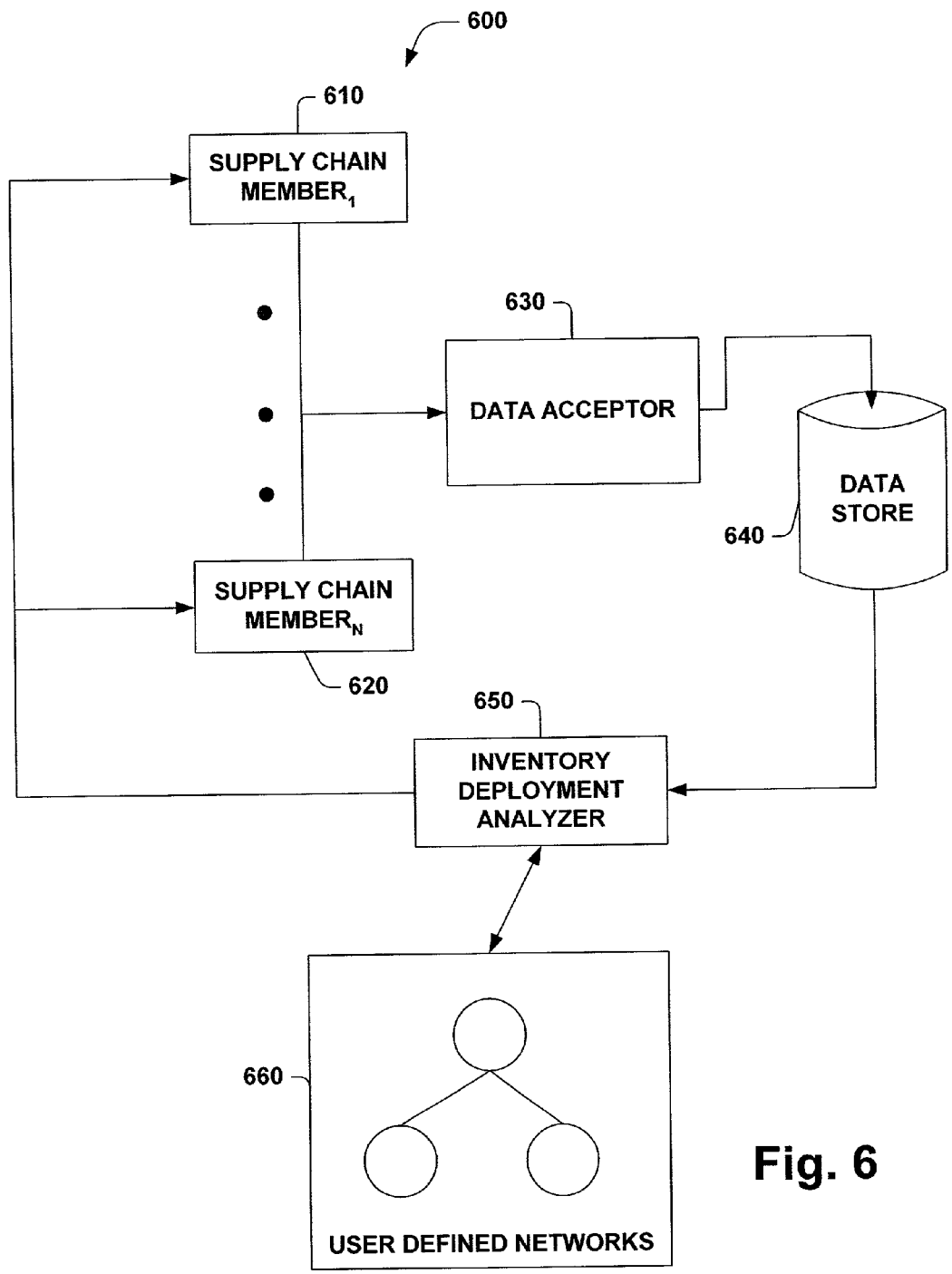
FIG. 6 is a schematic block diagram illustrating a continuous flow execution system, in accordance with an aspect of the present invention.

FIG. 6 illustrates a system 600 that provides for continuous flow execution of orders and inventory control. The system 600 includes a data store 640 into which one or more supply chain members (e.g., SUPPLY CHAIN MEMBER$_1$ 610 through SUPPLY CHAIN MEMBER$_N$ 620, N being an integer) deposit supply chain information (e.g., inventory positions, production capacity, supply categories, demand categories, demand networks, purchase orders, sales orders, warehouse orders) via a data acceptor 630. While a single data store 640 is illustrated, it is to be appreciated that the data may be stored in one or more standalone and/or distributed, co-operating data stores. The data stores may include, but are not limited to, databases, hypercubes, tables, spreadsheets, files, arrays, queues, stacks, heaps, lists, linked lists, neural networks, semantic maps and graphs.

The data may be extracted (e.g., pushed, pulled) from the supply chain members to the data store 640 and thus the data acceptor 630 does not need to reach through security measures (e.g., firewalls) associated with supply chain member data stores. The extraction may occur at times including, but not limited to, on a periodic basis, on a manual trigger and on a data update trigger. The data acceptor 630 can transform the supply chain data, which may be in inconsistent formats, to a common format associated with one or more supply chain schema. For example, the supply chain data may be transformed to conform to schema like those described in FIGS. 13 through 17. Furthermore the data acceptor 630 can validate the supply chain data before loading it into the data store 640.

The system 600 also includes an inventory deployment analyzer 650, which is operable to analyze data stored in the data store 640, to analyze user-defined networks 660 and to generate inventory transfer recommendations. A user-defined network 660 may be associated with a cycle, where a cycle is owned by a supply chain member and includes the user defined network, an active product set and a category set. The inventory deployment analyzer 650 may generate inventory transfer recommendations based on inventory distribution rules including, but not limited to equal share algorithms, proportional algorithms and priority algorithms.

A user-defined network 660 can include a set of facilities linked by distribution paths, where a facility may supply inventory to other facilities and/or may receive inventory from other facilities. Nodes in the user-defined network 660 may be associated with supply and/or demand information. In one example of the present invention, a user-defined network 660 is a directed acyclic graph and product can flow one distribution link per iteration of an algorithm implemented by the inventory deployment analyzer 650. Distribution path links in a user-defined network 660 may also be associated with a supply priority and/or demand priority that can be employed to determine the order of processing during analysis.

Continuous flow execution analyses performed by the inventory deployment analyzer 650 are executed according to the triggering mechanisms defined in configured cycles. Manual triggers are executed in response to a user selection. In one example of the present invention, periodic analyses are executed by a daemon process and database update triggers are executed in response to a signal, interrupt and/or message from the database that was updated.

Figure 7:
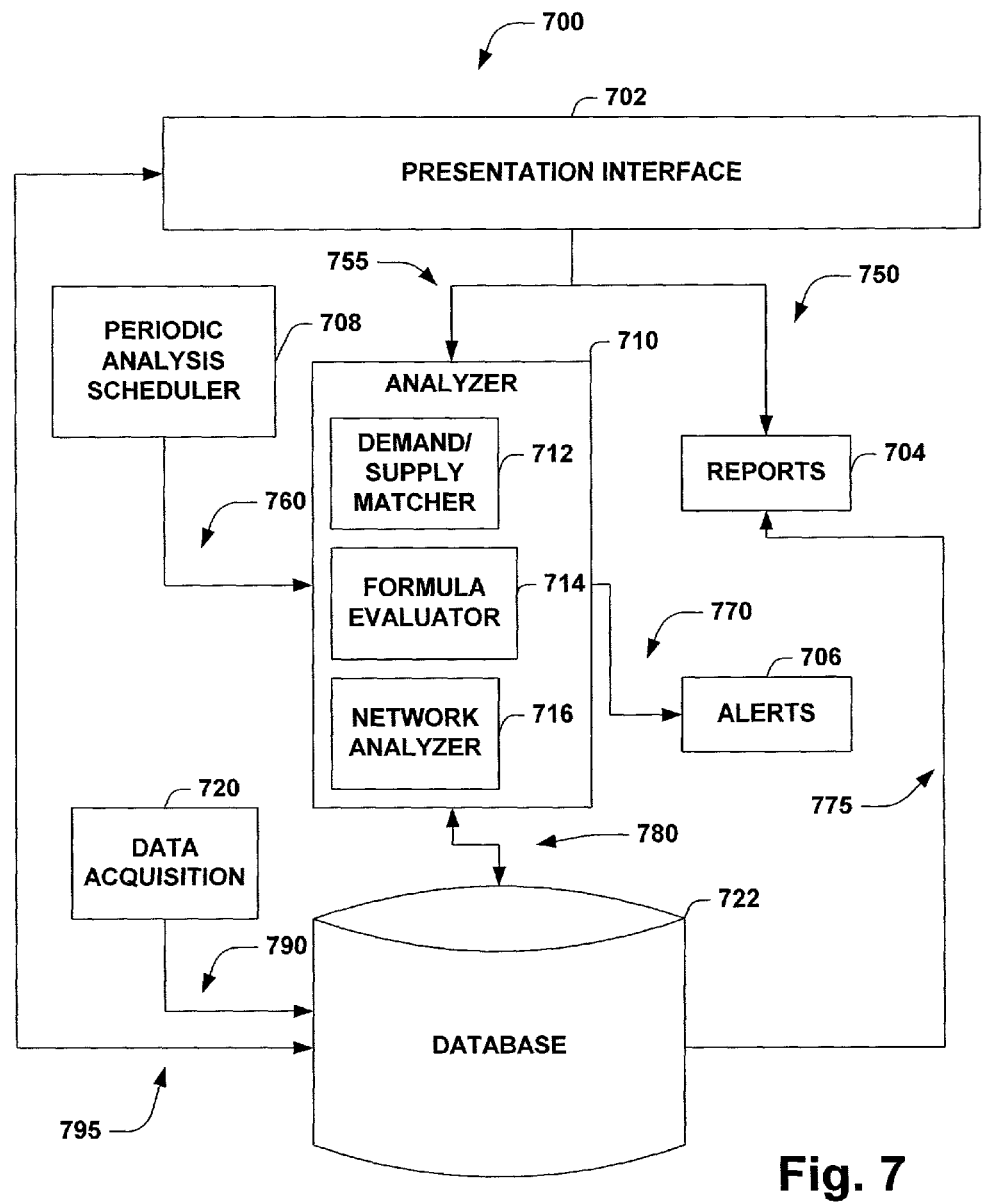
FIG. 7 is a schematic block diagram illustrating a sample architecture for a continuous flow execution system, in accordance with an aspect of the present invention.

FIG. 7 illustrates a sample architecture 700 for one example continuous flow execution (CFE) system. The architecture includes a presentation interface 702 through which inventory transfer recommendations will be displayed and through which entities including, but not limited to, a manual start trigger 755, a view report command 750, and cycle configuration data 795 may pass.

A view report command 750 may be forwarded to a reports component 704, which can retrieve the desired report(s) from a database 722 and present the reports to the requestor via the presentation interface 702. Such reports may be employed, for example, to determine whether inventory transfer recommendations should be executed. For example, the continuous flow execution analyzer 710 may determine that a first location, which had an initial inventory allocation determined at a prior point in time, would benefit from a subsequent inventory allocation. Thus, an inventory transfer recommendation may be generated. By examining the report(s) from the reports component 704, a user may timely execute the inventory transfer recommendation and remedy an impending inventory problem. Thus, more real-time inventory control is achieved than is possible with conventional systems, which facilitates reducing inventory and increasing profits.

A manual start trigger 755 may be passed to a continuous flow execution analyzer 710, which will then perform inventory deployment analysis. The architecture 700 also includes a periodic analysis scheduler 708 that may generate a start trigger 760 that is similarly passed to the continuous flow execution analyzer 710, which will then perform inventory deployment analysis. Inventory deployment analysis may also be triggered in the continuous flow execution analyzer 710 by an update to data in the database 722. For example, an inventory position may change to such a degree that current inventory deployments may lead to over and/or under supply conditions, and thus the inventory change may trigger a recalculation of current inventory deployments by the continuous flow execution analyzer 710 with resulting inventory transfer recommendations.

In addition to producing inventory transfer recommendations, the continuous flow execution analyzer 710 may generate one or more completion alerts 770 that are sent to an alerts component 706. In one example of the present invention, the alerts component 706 may then schedule and/or execute immediate inventory transfers and/or diversions. For example, at a first point in time a first consumer may have demanded a first quantity of a product. However, continuous flow execution analysis performed by the continuous flow execution analyzer 710 may have determined that at a second, later point in time, that the first consumer actually requires a greater quantity of the product, and that the product is required in a time frame outside normal shipping schedules. Thus, in addition to updating future demand parameters, the alert component 706 may send a message to a carrier destined for a second location, whose demand for the product is not as urgent, to divert to the first location. By way of illustration, a shipment of tires may have been put on a train from Akron destined for an assembly plant in California. However, due to an electricity shortage in California, and a greater than expected increase in demand for a certain type of automobile produced in Detroit, the entire train or a percentage of the train cars carrying tires could be diverted to Detroit. Such en-route redeployment facilitates optimizing just-in-time delivery for supply chains and thus facilitates minimizing inventory and maximizing profits.

In one example of the present invention, the continuous flow execution analyzer 710 includes a demand/supply matcher 712, a formula evaluator 714 and a network analyzer 716. The demand/supply matcher 712 is operable to identify nodes that are related by a supply/demand relationship, and to determine whether in an iteration of processing performed by the continuous flow execution analyzer 710 a supply node and a demand node will interact. The demand/supply matcher 712 may employ algorithms including, but not limited to, depth first tree traversals, breadth first tree traversals, in-order traversals and pre-order traversals. If a supply node and one or more demand nodes are going to interact, then the formula evaluator 714 may be employed to calculate the total demand at a supply node and the total supply available to a demand node. The formula evaluator 714 interacts with the network analyzer 716, which is operable to balance supply and demand in a user defined network according to one or more balancing formulae. Thus, the formula evaluator 714 and/or the network analyzer 716 may generate a balancing multiplier, where the balancing multiplier can be employed to distribute the available supply between the current demand. Such distribution may be affected by distribution goals including, but not limited to, maximizing allocation to certain demand nodes (based on factors like urgency, payment history, difficulty of distributing, and the like), maximizing breadth of allocation, attempting to equalize distribution and attempting to achieve market saturation.

The continuous flow execution analyzer 710 interacts with the database 722. For example, cycle configuration data, analysis results, inventory data and the like may pass between the continuous flow execution analyzer 710 and the database 722. The database may also receive data (e.g., inventory positions) from a data acquisition component 720 that may accept, transform, validate and load data from one or more supply chain members (not illustrated).

While FIG. 7 illustrates one example architecture 700 that can be employed to facilitate continuous flow execution, it is to be appreciated that other architectures may be employed in accordance with the present invention.

FIG. 8 is a flow chart illustrating a method 800 for providing continuous flow execution. At 805, general initializations occur. Such initializations include, but are not limited to, allocating memory, establishing pointers, establishing data communications, acquiring resources, instantiating objects, and setting initial values for variables.

At 810, the method acquires a supply and/or demand category. At 815, supply categories are matched with demand categories, to form one or more supply/demand pairs. The supply and/or demand categories may be, for example, formulae for calculating actual supply or demand quantities. Supply categories may be matched with demand categories through user-configurable matching entities including, but not limited to tables, graphs, neural networks and expert systems. At 820, a determination is made whether the last category has been acquired. If the determination at 820 is NO, then processing returns to 810, otherwise processing proceeds to 825. At 825, the supply/demand pairs are prioritized. For example, some demand nodes may have a higher demand priority than other nodes (e.g., the consumer with the best payment history, the consumer achieving the highest margin on sales, the consumer achieving the highest volume of sales).

At 830, after the pair prioritization of 825 is substantially complete, a supply/demand pair is acquired. At 835, the actual quantity of supply and demand for the nodes associated with the supply/demand pair are computed, from which a balancing multiplier (e.g., fair share multiplier) can be computed at 840, where the balancing multiplier can be employed to facilitate balancing inventory distribution. Balancing rules may include, but are not limited to, maximizing equity of distribution, maximizing market saturation, minimizing over-supply and minimizing under-supply. Based on the balancing multiplier of 840 and the actual quantity determinations of 835, at 845 an inventory transfer recommendation (reco) is generated. At 850, a determination is made concerning whether the last prioritized supply/demand pair has been processed. If the determination at 850 is NO, then processing returns to 830, otherwise processing proceeds to 855.

At 855, one or more reports concerning the inventory transfer recommendations are made. For example, reports may be sent based on factors including, but not limited to supplier identity, consumer identity, inventory transfer size, transferred product identity and the like. In one example of the present invention, processing would conclude at 855. But in another example of the present invention, automated execution of the inventory transfer recommendations may occur.

Thus, at 860, an inventory transfer recommendation is acquired, and at 865 a determination is made whether the inventory transfer recommendation is accepted. Such acceptance may be made, for example, by entities including but not limited to a human, a neural network, an expert system and a graph analyzer. If the determination at 865 is NO, to not accept the recommendation, then processing proceeds ahead to 880, otherwise processing proceeds to 870, where a transfer order is generated. At 875 the transfer may be scheduled. Such scheduling may involve actions including, but not limited to, updating regularly scheduled shipments, scheduling a special shipment and diverting an en route shipment, for example.

At 880, a determination is made concerning whether the last inventory transfer recommendation has been processed. If the determination at 880 is NO, then processing returns to 855, otherwise processing concludes.

Figure 9:
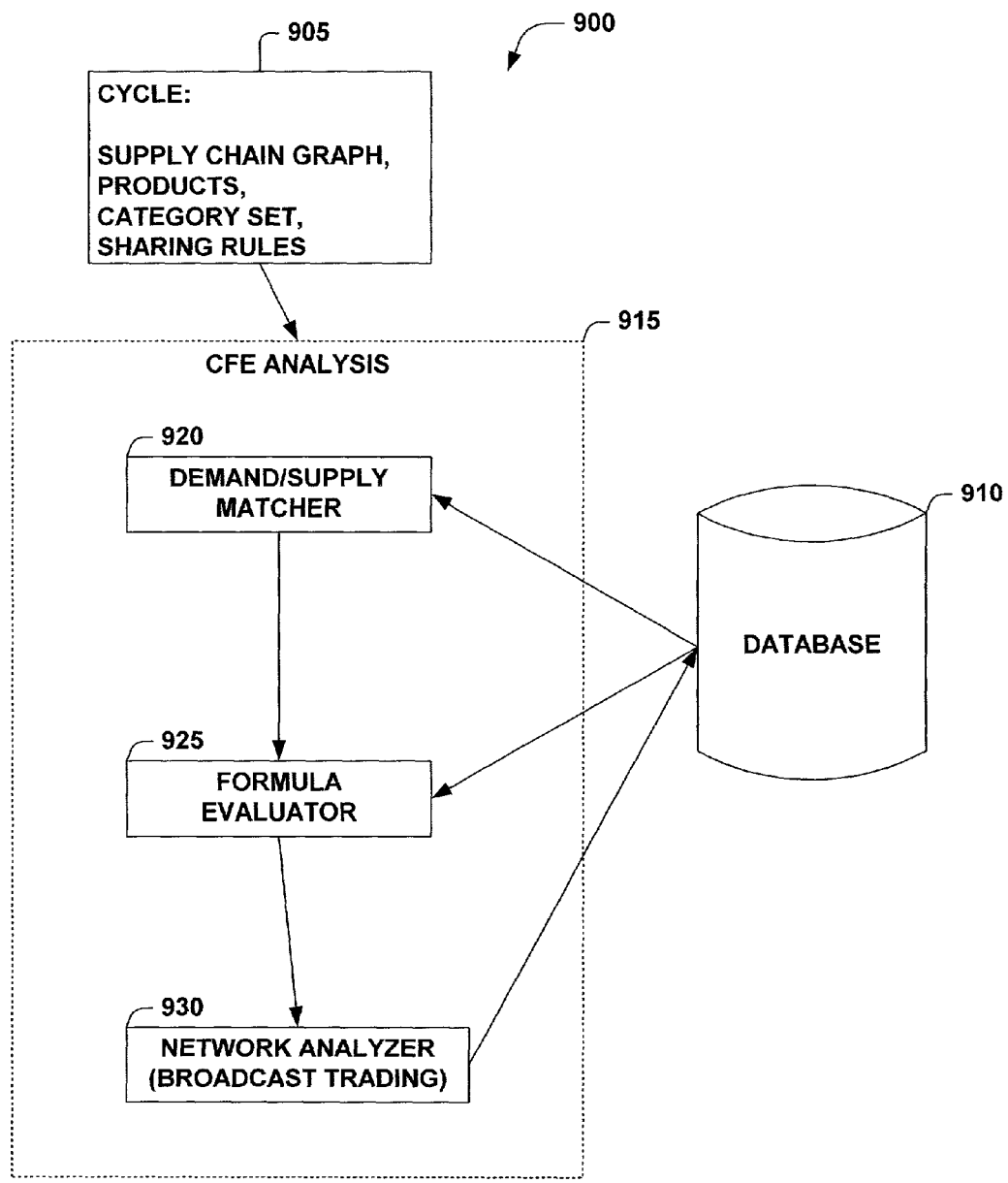
FIG. 9 is a schematic block diagram illustrating a sample architecture for a continuous flow execution system, in accordance with an aspect of the present invention.

FIG. 9 is a schematic block diagram illustrating a sample architecture 900 for a continuous flow execution (CFE) system where the continuous flow execution system employs a broadcast trading algorithm in a network analyzer 930. The network analyzer 930 forms part of a CFE analysis component 915 that also includes a demand/supply matcher 920 and a formula evaluator 925 substantially similar to the demand/supply matcher 712 (FIG. 7) and the formula analyzer 716 (FIG. 7).

The CFE analysis component 915 accepts as input a cycle packet 905, where the cycle packet 905 may hold information including, but not limited to a supply chain graph (e.g., nodes connected by links), a product list, a category set and one or more sharing rules for the supply chain graph). In the example CFE analysis component 915 illustrated in FIG. 9, the network analyzer will interact with the formula evaluator 925 and the database 910 to produce inventory transfer recommendations based on the broadcast trading algorithm described in connection with FIGS. 10 through 12.

Thus, turning to FIG. 10, a flow chart illustrates a broadcast trading method 1000 for supporting continuous flow execution. At 1000, general initializations occur. Such initializations include, but are not limited to, allocating memory, establishing pointers, establishing data communications, acquiring resources, instantiating objects, and setting initial values for variables. At 1020, a supply category is applied to a demand category to generate one or more matched supply/demand pairs (e.g., supply nodes and demand nodes that are going to interact in the iteration of the broadcast trading algorithm).

At 1030, a matched supply/demand pair is acquired, and at 1040, demand nodes make requests for a first quantity of a product. At 1050, supply nodes will offer a share of product based on the requested demand in light of the balancing multiplier and at 1060, the demand nodes will order a quantity of the product based on the offered amount. At 1070, a determination is made concerning whether the demand/supply determinations have approached a pre-determined threshold (e.g., zero). If the determination at 1070 is NO, then processing returns to 1030, otherwise processing will conclude.

Figure 11:
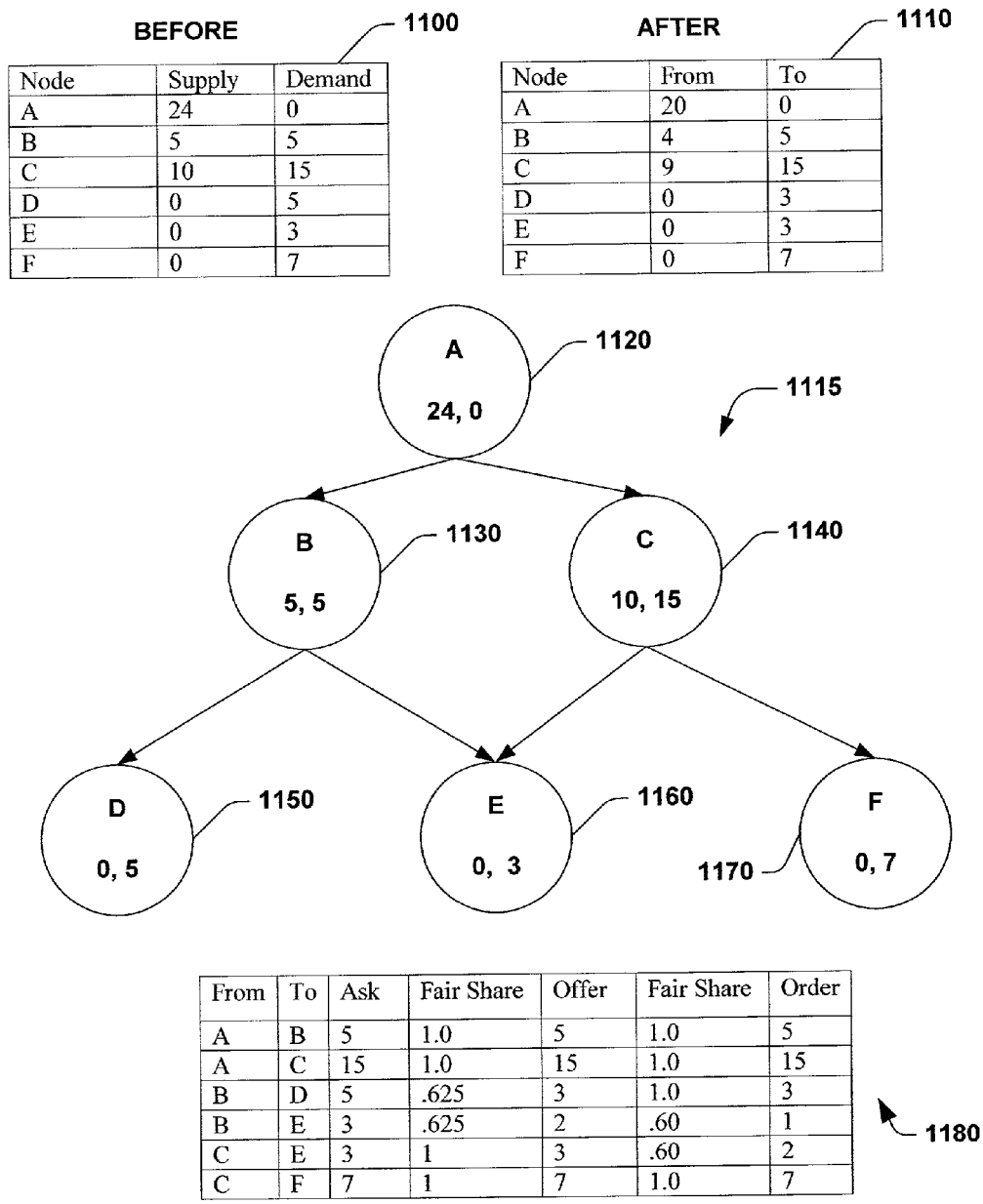
FIG. 11 illustrates supply and demand processing, in accordance with an aspect of the present invention.
Figure 12:
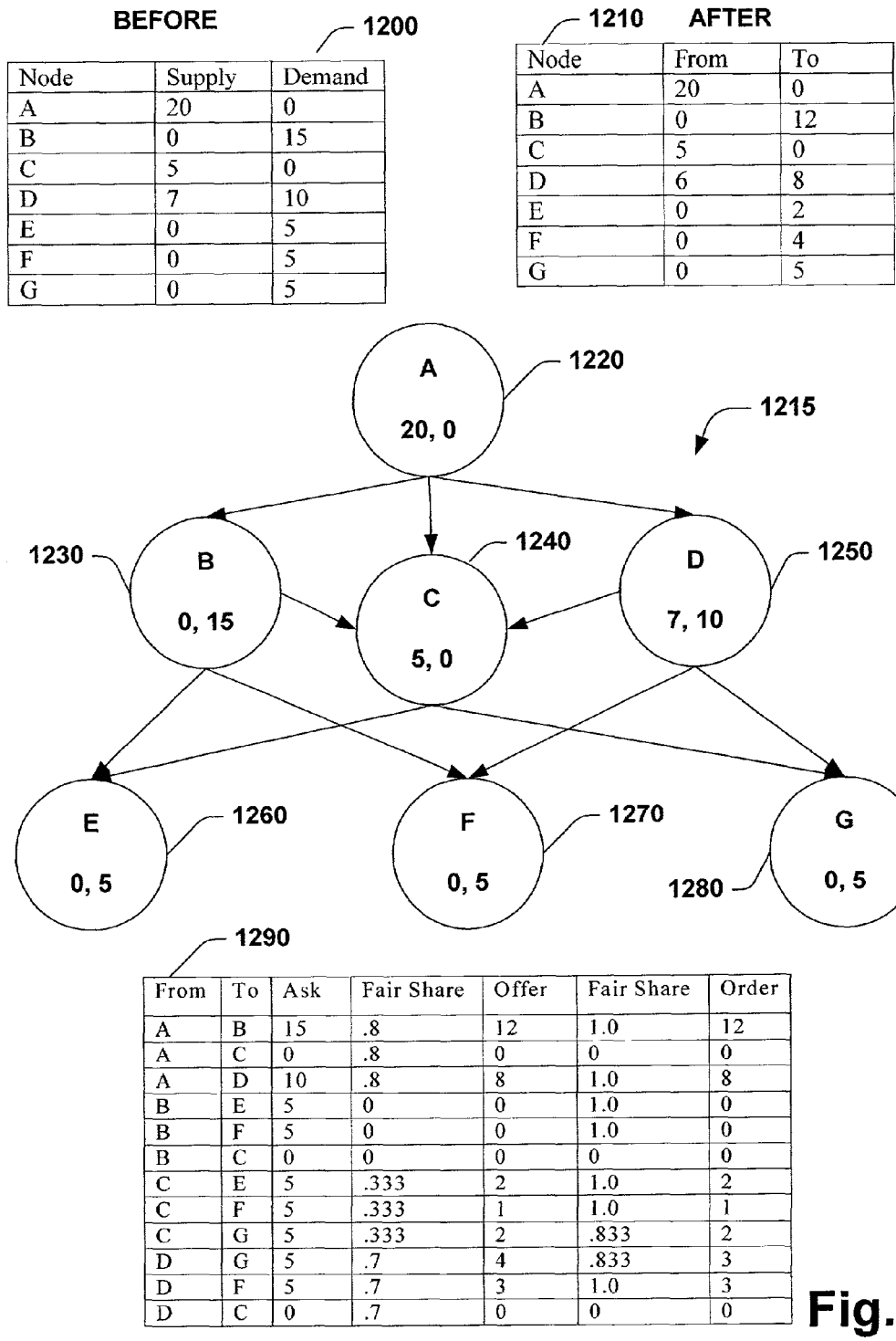
FIG. 12 illustrates supply and demand processing, in accordance with an aspect of the present invention.

Two examples of the method 1000 in operation, where the balancing multiplier is a fair share (e.g., pro rata) multiplier are provided in FIGS. 11 and 12.

FIG. 11 illustrates one example of supply and demand processing according to the broadcast trading algorithm described in connection with FIG. 10. Initially, the supply and demand situation is described in table 1100, and illustrated graphically in graph 1115. In table 1100, nodes in graph 1115 are described by name, current supply, and current demand request. In graph 1115, nodes are illustrated with a name, a supply amount and a demand request. For example, node 1120 is labeled node A, has a current supply of twenty-four and a current demand request of zero. While one supply amount and one demand request are illustrated for each node in graph 1115, it is to be appreciated that each node may store supply and/or demand information for one or more products.

Graph 1115 is an acyclic directed graph and thus includes nodes and directional links. Thus, node 1120 can receive demand requests from nodes 1130 and 1140 and can provide supply to nodes 1130 and 1140. However, node 1120 cannot receive supply from node 1130 or node 1140.

TABLE 1100

| Node | Supply | Demand |
|------|--------|--------|
| A | 24 | 0 |
| B | 5 | 5 |
| C | 10 | 15 |
| D | 0 | 5 |
| E | 0 | 3 |
| F | 0 | 7 |

Table 1180 illustrates calculations made in accordance with the broadcast trading algorithm described in connection with FIG. 10.

TABLE 1180

| From | To | Ask | Fair Share | Offer | Fair Share | Order |
|------|----|----|-----------|-------|-----------|-------|
| A | B | 5 | 1.0 | 5 | 1.0 | 5 |
| A | C | 15 | 1.0 | 15 | 1.0 | 15 |
| B | D | 5 | .625 | 3 | 1.0 | 3 |
| B | E | 3 | .625 | 2 | .6 | 1 |
| C | E | 3 | 1 | 3 | .6 | 2 |
| C | F | 7 | 1 | 7 | 1.0 | 7 |

Node A 1120 received a request from node B 1130 for five units. Similarly, node A 1120 received a request from node C 1140 for fifteen units. Thus, the total demand at node A 1120 is twenty. Node A 1120 has an available supply of twenty four units, and thus is able to satisfy 100% of the demand during this iteration of the broadcast trading algorithm. Thus, the balancing multiplier is irrelevant, and can be set to 1.0, indicating that 100% of requests will be filled. Thus, node A 1120 can offer five units to node B 1130, which will order five units from node A 1120, and can offer fifteen units to node C 1140, which will order fifteen units from node A 1120.

Node B 1130 received a request for five units from node D 1150 and received a request for three units from node E 1160. Thus, the total demand at node B 1130 is eight units, but the total supply at node B 1130 is five units, and thus a balancing multiplier must be computed. In the example broadcast trading algorithm illustrated in FIG. 11, the balancing multiplier will be a fair share, pro-rata multiplier. Thus, the total supply is divided by the total demand and offers are made in accordance with the multiplier. Therefore, node B 1130 generates a fair share multiplier of 0.625 (⅝) and after rounding, offers three units to node D 1150 (approximately 0.625×5) and offers two units to node E 1160 (approximately 0.625×3), which exhausts the supply available from node B 1130. Node D 1150 therefore orders three units from node B 1130 (approximately 0.6×5) and node E 1160 orders one unit (approximately 0.6×2) from node B 1130 (since the other desired two units will be available via a balancing multiplier of 1.0 from node C 1140). In an alternative example of the present invention, node D 1150 would order five units from node B 1130 and node E 1160 would order zero units from node B 1130, since both node D 1150 and node E 1160 would be able to look ahead and determine that node C 1140 would be able to satisfy the requirements of node E 1160, thus freeing the supply of node B 1130 for node D 1150.

Similarly, node C 1140 receives a request from node E 1160 for three units and from node F 1170 for seven units. Thus, the total demand at node C 1140 is ten units, while the total supply available at node C is ten units. Thus, the balancing multiplier is irrelevant and can be set to 1.0, since 100% of the demand requests can be filled. Therefore, node C 1140 offers three units to node E 1160 and offers seven units to node F 1170. Node E 1160 then orders two units, (since it already had one unit supplied from node B 1130) and node F 1170 orders seven units. After the inventory deployment recommendations recorded in Table 1180 are accepted, the inventory transfer situation for the network can be viewed in table 1110, which records supply from and to each node.

TABLE 1110

| Node | From | To |
|------|------|-----|
| A | 20 | 0 |
| B | 4 | 5 |
| C | 9 | 15 |
| D | 0 | 3 |
| E | 0 | 3 |
| F | 0 | 7 |

Thus, node A sends out twenty units and receives zero units, while node F sends out zero units and receives seven units.

FIG. 12 illustrates another example of supply and demand processing in accordance with the broadcast trading algorithm illustrated in connection with FIG. 10. Table 1200 and graph 1215 illustrate the supply and demand request situation before the iteration of the broadcast trading algorithm. Table 1290 illustrates calculations made in accordance with the broadcast trading algorithm and table 1210 illustrates flow of units to and from nodes in graph 1215.

TABLE 1200

| Node | Supply | Demand |
|------|--------|--------|
| A | 20 | 0 |
| B | 0 | 15 |
| C | 5 | 0 |
| D | 7 | 10 |
| E | 0 | 5 |
| F | 0 | 5 |
| G | 0 | 5 |

TABLE 1290

| From | To | Ask | Fair Share | Offer | Fair Share | Order |
|------|-----|-----|-----------|-------|-----------|-------|
| A | B | 15 | .8 | 12 | 1.0 | 12 |
| A | C | 0 | .8 | 0 | 0 | 0 |
| A | D | 10 | .8 | 8 | 1.0 | 8 |
| B | E | 5 | 0 | 0 | 1.0 | 0 |
| B | F | 5 | 0 | 0 | 1.0 | 0 |
| B | C | 0 | 0 | 0 | 0 | 0 |
| C | E | 5 | .333 | 2 | 1.0 | 2 |
| C | F | 5 | .333 | 1 | 1.0 | 1 |
| C | G | 5 | .333 | 2 | .833 | 2 |
| D | G | 5 | .7 | 4 | .833 | 3 |
| D | F | 5 | .7 | 3 | 1.0 | 3 |
| D | C | 0 | .7 | 0 | 0 | 0 |

TABLE 1210

| Node | From | To |
|------|------|-----|
| A | 20 | 0 |
| B | 0 | 12 |
| C | 5 | 0 |
| D | 6 | 8 |
| E | 0 | 2 |
| F | 0 | 4 |
| G | 0 | 5 |

Figure 13:
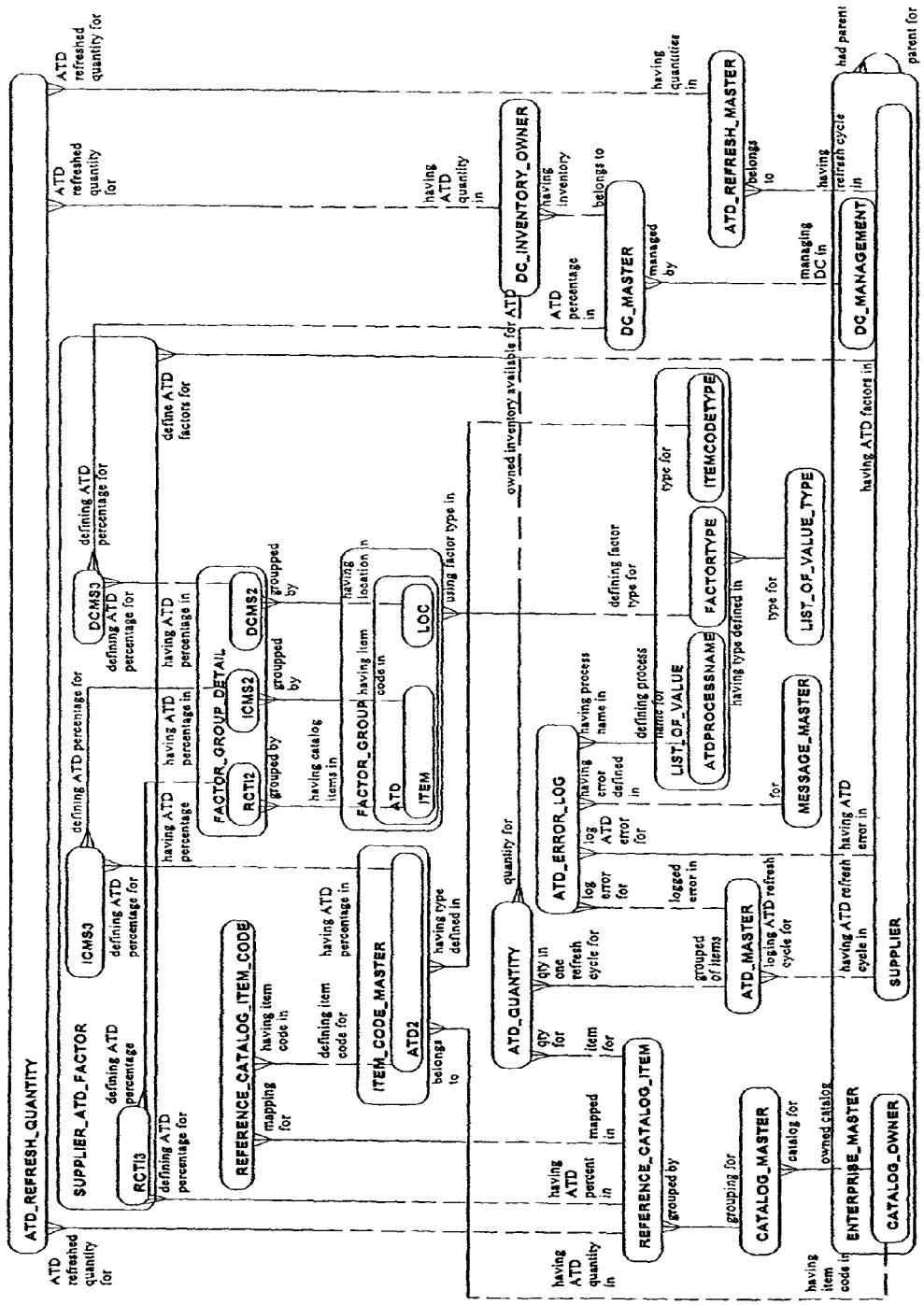
FIG. 13 illustrates a schema associated with refreshing available to deliver information, where the schema may be employed in conforming supply chain data in accordance with an aspect of the present invention.

Turning now to FIG. 13, an example schema associated with refreshing available to deliver information is illustrated. It is to be appreciated that the schema is but one possible schema and is intended as an illustration and not a limitation. The schema facilitates conforming data concerning inventory that is available to deliver. The illustrated schema defines relationships between ATD (Available to Deliver) entities to calculate how much inventory an enterprise can supply to a buyer. Suppliers can define what percentage of inventory can be used to fulfill a buyer request. The inventory percentage can be applied to an individual item, a group of items or substantially all items in a location. A process is run in a configurable interval to refresh the available to deliver inventory quantity for suppliers. Errors occurring during the refresh process may be stored in the database for further analysis.

Figure 14:
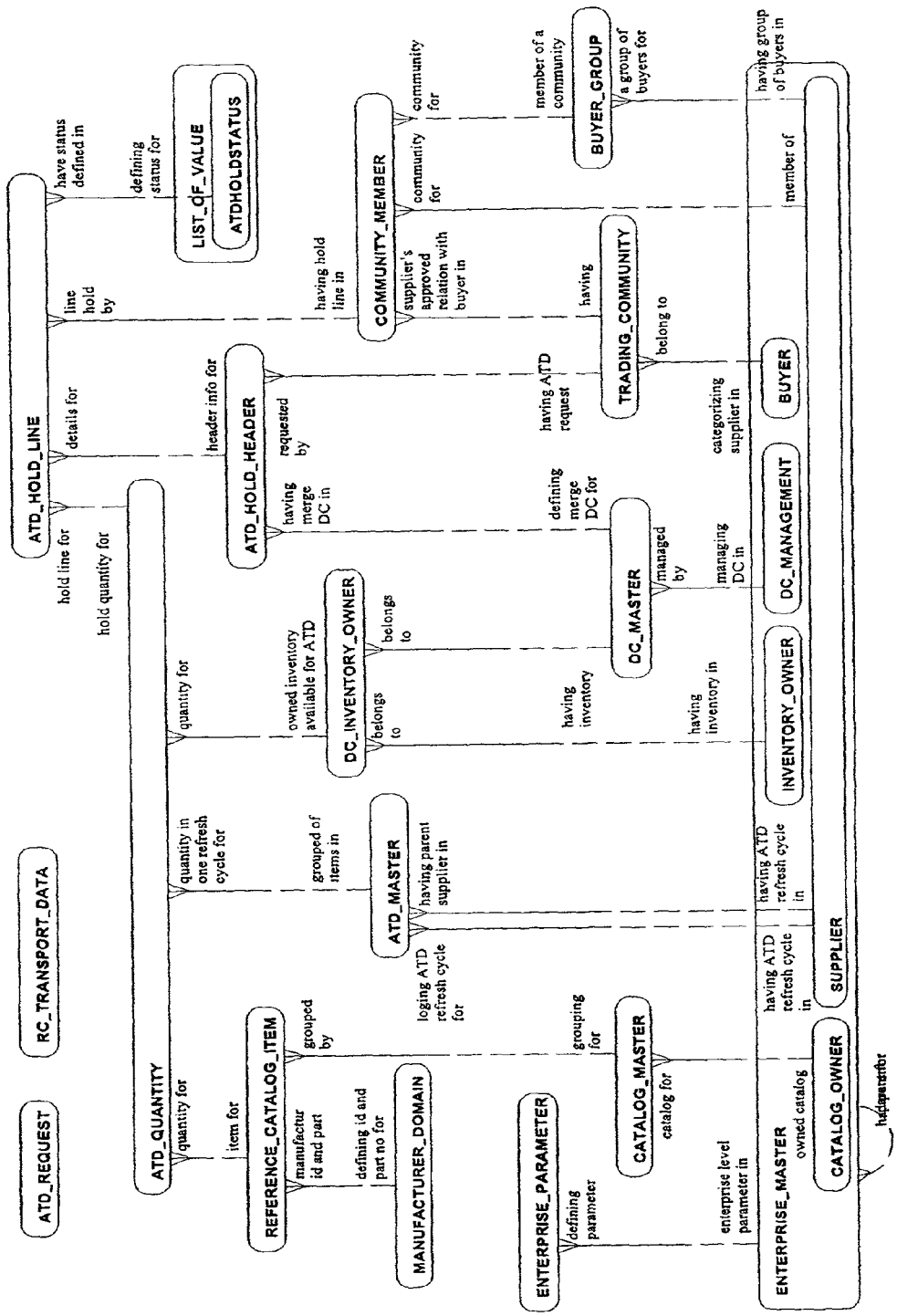
FIG. 14 illustrates a schema associated with a trading community, where the schema may be employed in conforming supply chain data in accordance with an aspect of the present invention.

Turning now to FIG. 14, an example schema associated with a trading community is illustrated. It is to be appreciated that the schema is but one possible schema and is intended as an illustration and not a limitation. The schema facilitates conforming data concerning trading partners that form trading communities. Trading communities are fulfillment networks where buyers and suppliers meet. To facilitate buyers and suppliers trading, they should be in the same trading community. Such buyers and suppliers should also have a common item identifier in order to trade. The common item identifier can be, for example, a combination of manufacturing company and manufacturing part number. Suppliers can have buyer groups in which they define the inventory quantity limit that a buyer can request from them. Once a supplier states that it can fulfill a buyer request, the buyer is allowed to hold the inventory for a supplier configurable amount of time before the system releases the inventory back to the pool for other buyer requests.

Figure 15:
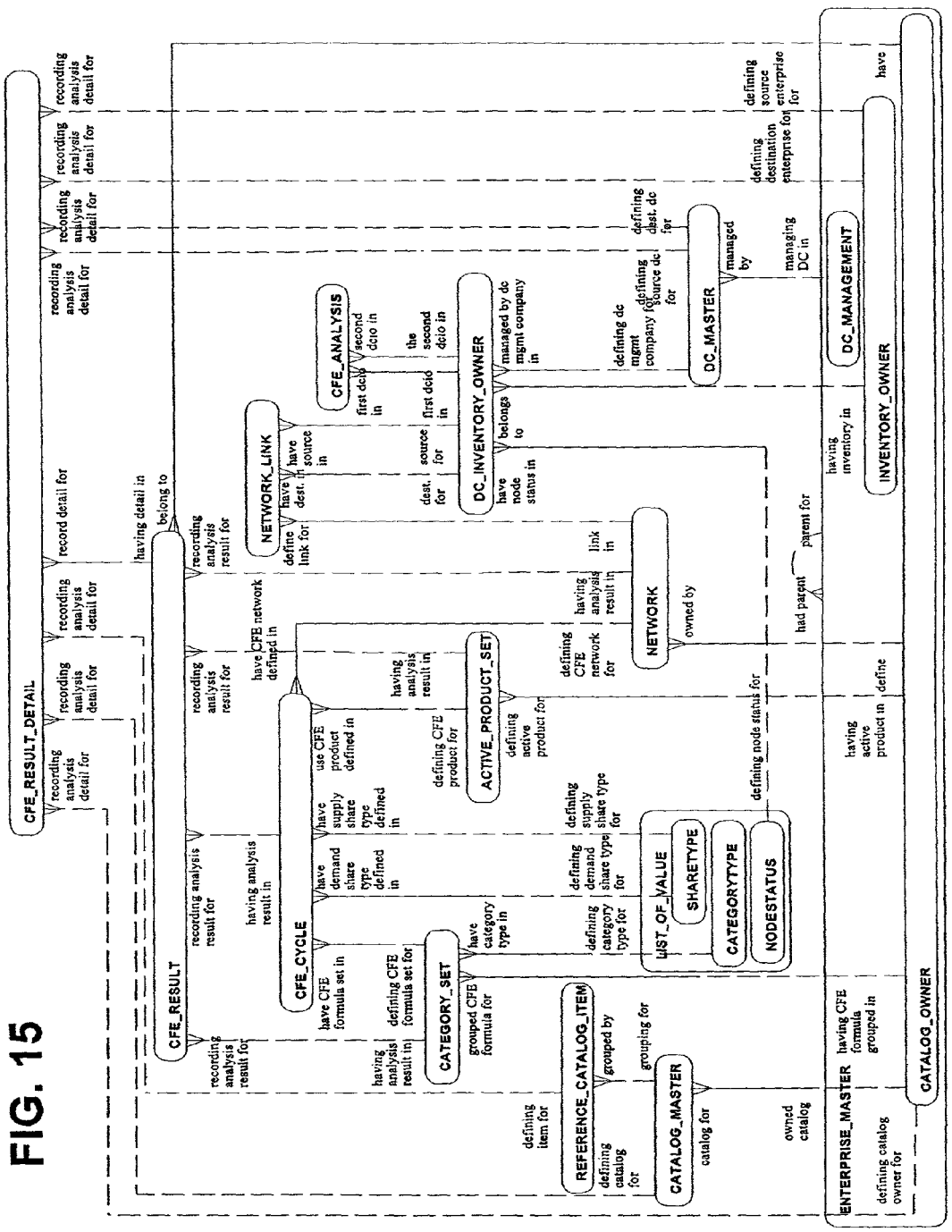
FIG. 15 illustrates a schema associated with a CFE system, where the schema may be employed in conforming supply chain data in accordance with an aspect of the present invention.

Turning now to FIG. 15, an example schema associated with continuous flow execution is illustrated. It is to be appreciated that the schema is but one possible schema and is intended as an illustration and not a limitation. The illustrated schema facilitates analyzing and reporting whether specific sites need inventory refilled at the time a CFE cycle is started. A CFE cycle specifies a category set (prioritized and matched demand/supply formulas), active product set (the products to be analyzed), and a network linking supply sites with demand sites.) Results are stored for later presentation to users on demand. The CFE analysis is performed on items characterized as "CFE-enabled", using a configurable set of formula.

Figure 16:
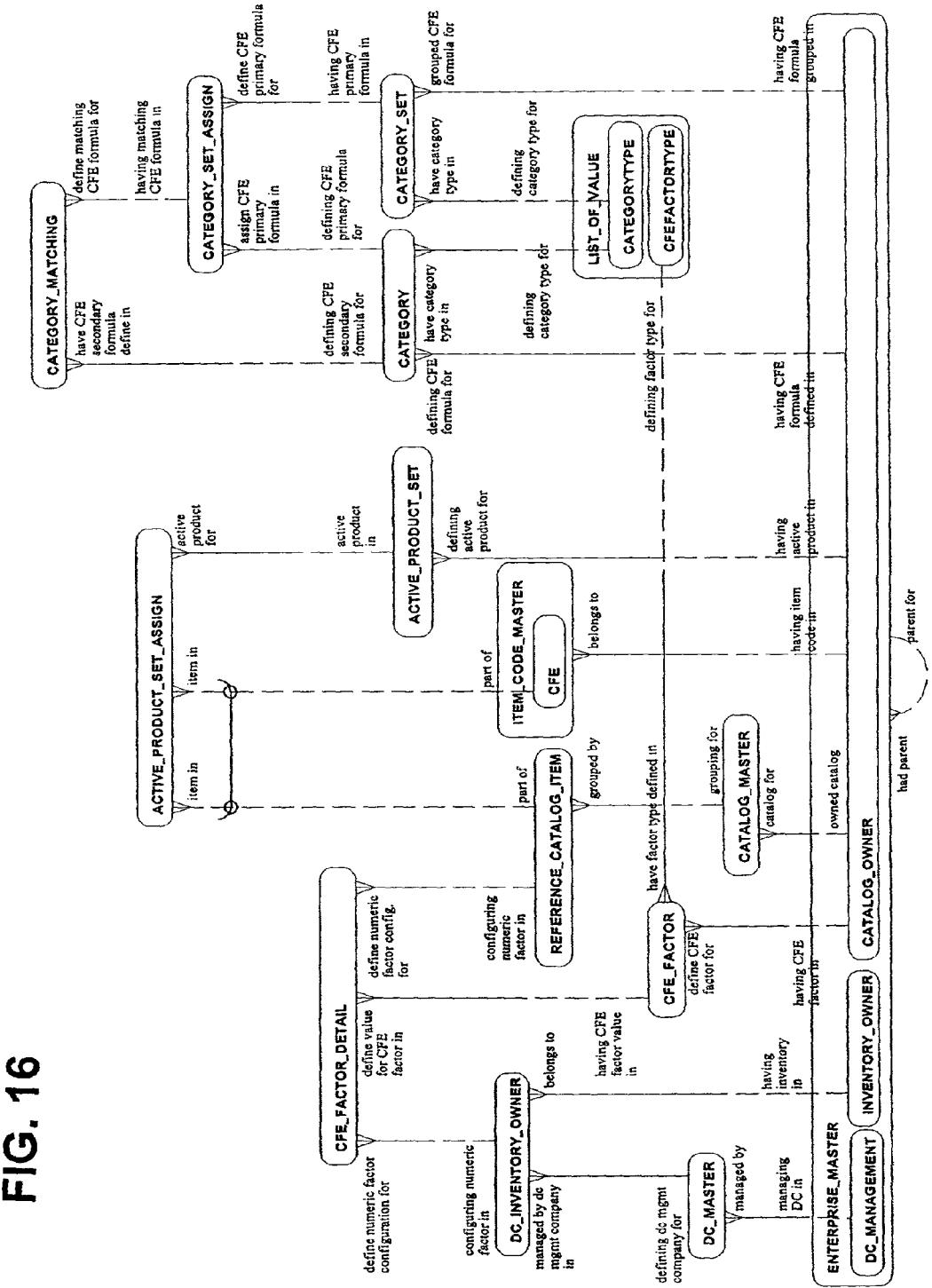
FIG. 16 illustrates a schema associated with CFE formulae, where the schema may be employed in conforming supply chain data in accordance with an aspect of the present invention.

Turning now to FIG. 16, an example schema associated with a continuous flow execution formula is illustrated. It is to be appreciated that the schema is but one possible schema and is intended as an illustration and not a limitation. The illustrated schema defines formulae and their relationships used for supply and demand in CFE. The schema also defines the "CFE enabled" items and configurable CFE factors against them. CFE factors are numbers supplied by enterprises involved in CFE networks that may affect the CFE analysis calculation. Examples of CFE factors are projected demand quantity or manufactured quantity.

Figure 17:
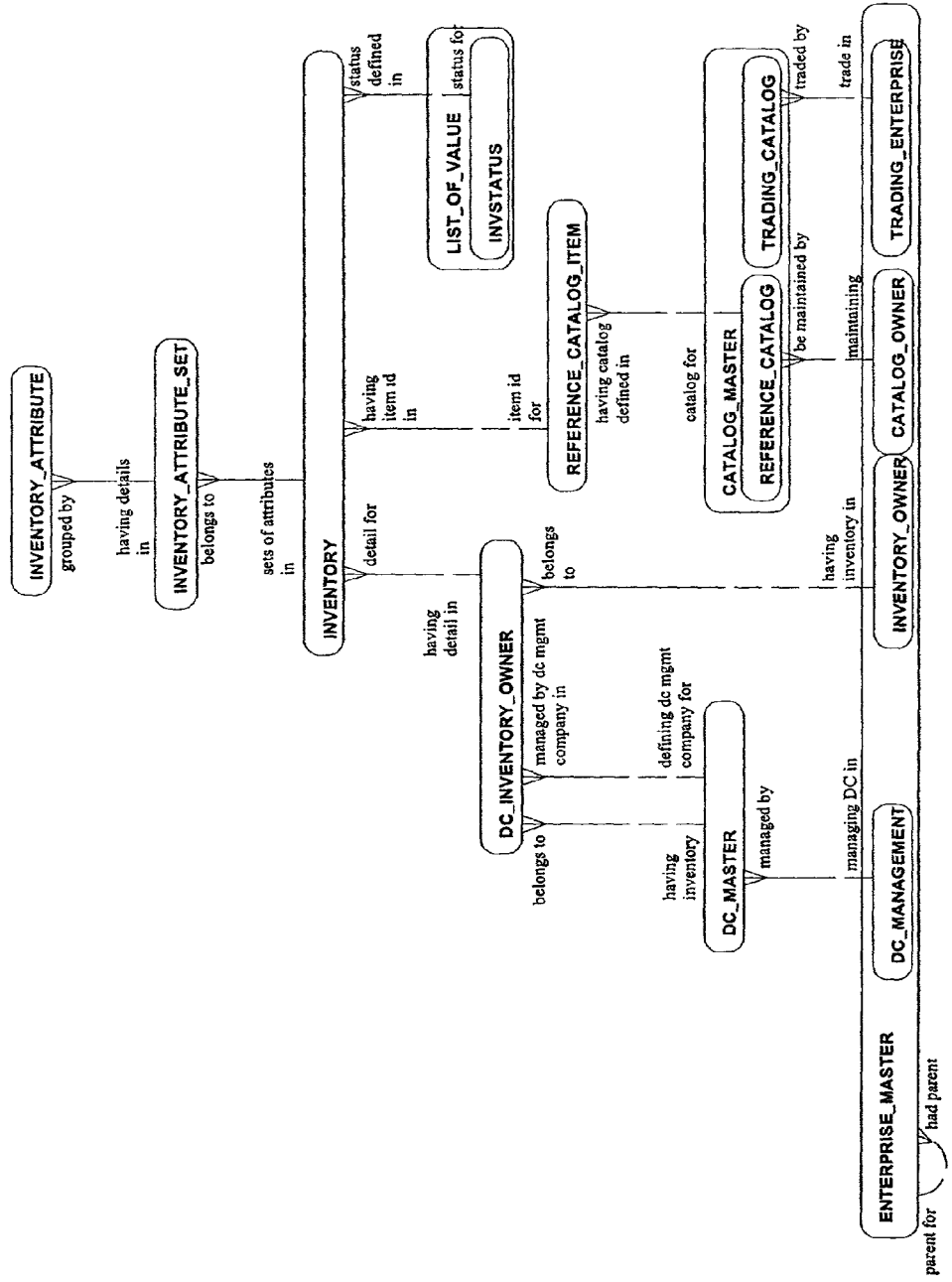
FIG. 17 illustrates a schema associated with inventory, where the schema may be employed in conforming supply chain data in accordance with an aspect of the present invention.

FIG. 17 illustrates a schema associated with inventory. It is to be appreciated that the schema is but one possible schema and is intended as an illustration and not a limitation. The schema facilitates conforming data concerning inventory between supply chain members. Thus, the schema facilitates storing inventory information for registered enterprises in a common format that simplifies optimally sourcing purchase orders.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for providing continuous flow execution of orders, the method comprising:
    accepting, by a computing device, a cycle comprising a distribution network, an active product set, a category set and a plurality of sharing rules, wherein
        the distribution network comprises a plurality of nodes, wherein the plurality of nodes represent a set of facilities that are linked to one another in a directed acyclic graph;
        the active product set comprises a plurality of active products,
        the category set comprises a plurality of supply categories and a plurality of demand categories wherein
            each of the plurality of supply categories is associated with a respective one of a plurality of supply chain members and a respective one of the plurality of nodes and comprises a supply formula for calculating a quantity of supply of the active product set available from the respective one of the plurality of nodes, each of the supply categories being conformed to a common schema from multiple different supply chain data, and
            each of the plurality of demand categories is associated with a respective one of the plurality of supply chain members and a respective one of the plurality of nodes and comprises a demand formula for calculating a quantity of demand for the active product set from the respective one of the plurality of nodes;
    transforming the demand categories to a common format associated with one or more supply chain common schema;
    matching the plurality of supply categories to the plurality of demand categories to produce a plurality of matched pairs, each matched pair comprising a respective one of the plurality of supply categories and a respective matching one of the plurality of demand categories, wherein the node associated with the one of the plurality of supply categories is adjacent within the directed acyclic graph to the node associated with the respective matching one of the plurality of demand categories;
    prioritizing the plurality of matched pairs;
    determining, using the computing device, for each matching pair, the quantity of supply for the node associated with the respective supply category using the respective supply formula and the quantity of demand for the node associated with the respective demand category using the respective demand formula;
    balancing, using the computing device, the supply and demand for the plurality of nodes in the inventory network;
    generating one or more inventory transfer recommendations; and
    transmitting, over at least one network, the transfer recommendations to one or more of the plurality of the plurality of supply chain members affected by the transfer recommendations, wherein the transfer recommendations result in the automatic transfer of items to substantially match the balanced supply and demand for the plurality of nodes.

2. The method of claim 1 where balancing the supply and demand in the inventory network comprises:
    for each of at least a first subset of the plurality of nodes:
    determining a total supply of a product at the respective node;
    determining a total demand for the product at the respective node;
    determining a balancing multiplier, where the balancing multiplier is related to the ratio between the total supply of the product at the respective node and the total demand for the product at the respective node;
    accepting one or more demand requests from a second subset of the plurality of nodes asking a third subset of the plurality of nodes for a first quantity of a product;
    the third subset of the plurality of nodes offering a fair share of the product to the one or more demand nodes; and
    the second subset of the plurality of nodes ordering a second quantity of the product, where the second quantity is less than or equal to the first quantity and where the second quantity is related to the first quantity by the balancing multiplier.

3. The method of claim 1 wherein the plurality of nodes are linked to one another in a linked list.

4. The method of claim 1 wherein the plurality of nodes are linked to one another in a heap.

5. The method of claim 1 wherein the plurality of nodes are linked to one another in a stack.

6. The method of claim 1 wherein the plurality of nodes are linked to one another in an array.

7. A method for providing continuous flow execution of orders, the method comprising:
    accepting, over at least one network, one or more supply categories conformed to supply chain data with one or more common schema received from a plurality of supply chain members, wherein each of the one or more supply categories is associated with a respective one of the plurality of supply chain members and a respective one of a plurality of nodes and comprises a supply formula for calculating a quantity of supply of an active product set available from the respective one of the plurality of nodes;

permitting access to the conformed supply chain data by a plurality of the multiple supply chain members via at least one network;

establishing one or more relationships between a first supply chain member and one or more second supply chain members of the multiple supply chain members, such that the respective nodes associated with the first supply member and the second supply member wherein the first supply chain member and one or more second supply chain members represent a set of facilities that are linked in a directed acyclic graph;

accepting, over at least one network, one or more demand categories from a plurality of the multiple supply chain members, wherein each of the one or more demand categories is associated with a respective one of the plurality of supply chain members and a respective one of a plurality of nodes and comprises a demand formula for calculating a quantity of demand for the active product set from the respective one of the plurality of nodes;

transforming the demand categories to a common format associated with one or more supply chain common schema;

matching the one or more supply categories to the one or more demand categories to produce one or more matched pairs, each matched pair comprising a respective one of the one or more supply categories and a respective matching one of one or more demand categories, wherein the node associated with the one of the plurality of supply categories is adjacent within the directed acyclic graph to the node associated with the respective matching one of the plurality of demand categories;

prioritizing the one or more matched pairs;

determining, using the computing device, for each matching pair, the quantity of supply for the node associated with the respective supply category using the respective supply formula and the quantity of demand for the node associated with the respective demand category using the respective demand formula;

balancing, using a processor, the supply and demand in the inventory network;

generating one or more inventory transfer recommendations; and reporting over at least one network the one or more inventory transfer recommendations to supply chain members of the multiple supply chain members with access to the conformed supply chain data, wherein the transfer recommendations result in the automatic transfer of items to substantially match the balanced supply and demand for the plurality of nodes.

8. The method of claim 7 where balancing the supply and demand in the inventory network comprises:

for each of at least a first subset of the plurality of nodes:
determining a total supply of a product at the respective node;
determining a total demand for the product at the respective node;
determining a balancing multiplier, where the balancing multiplier is related to the ratio between the total supply of the product at the respective node and the total demand for the product at the respective node;
accepting one or more demand requests from a second subset of the plurality of nodes asking a third subset of the plurality of nodes for a first quantity of a product;
the third subset of the plurality of nodes offering a fair share of the product to the one or more demand nodes; and
the second subset of the plurality of nodes ordering a second quantity of the product, where the second quantity is less than or equal to the first quantity and where the second quantity is related to the first quantity by the balancing multiplier.

9. The method of claim 8 where balancing further comprises reporting wherein the one or more inventory transfer recommendations to one or more supply chain members configures the sourcing facilitating optimization as between the supply chain members via access to the conformed supply chain data to ask at least one of the supply chain members to accept a purchase order.

10. The method of claim 8 where balancing further comprises reporting wherein the one or more inventory transfer recommendations to one or more supply chain members configures the sourcing facilitating optimization as between the supply chain members via access to the conformed supply chain data to ask at least one of the supply chain members for an inventory hold for a supplier configurable amount by at least one of the supply chain members of time before the inventory is released.

11. The method of claim 7 where balancing further comprises reporting wherein the one or more inventory transfer recommendations to one or more supply chain members configures the sourcing facilitating optimization as between the supply chain members via access to the conformed supply chain data to ask at least one of the supply chain members to accept a purchase order.

12. The method of claim 7 where balancing further comprises reporting wherein the one or more inventory transfer recommendations to one or more supply chain members configures the sourcing facilitating optimization as between the supply chain members via access to the conformed supply chain data to ask at least one of the supply chain members for an inventory hold for a supplier configurable amount by at least one of the supply chain members of time before the inventory is released.

13. The method of claim 7 wherein the plurality of nodes are linked to one another in a linked list.

14. The method of claim 7 wherein the plurality of nodes are linked to one another in a heap.

15. The method of claim 7 wherein the plurality of nodes are linked to one another in a stack.

16. The method of claim 7 wherein the plurality of nodes are linked to one another in an array.

* * * * *

UNITED STATES PATENT AND TRADEMARK OFFICE
CERTIFICATE OF CORRECTION

| | |
|---|---|
| PATENT NO. | : 8,725,594 B1 |
| APPLICATION NO. | : 09/998698 |
| DATED | : May 13, 2014 |
| INVENTOR(S) | : Davies et al. |

Page 1 of 1

It is certified that error appears in the above-identified patent and that said Letters Patent is hereby corrected as shown below:

In the Claims:

Claim 1, Column 20, Lines 26-27, delete the second "of the plurality" following the first "of the plurality".

Signed and Sealed this
Twenty-third Day of September, 2014

Michelle K. Lee
*Deputy Director of the United States Patent and Trademark Office*